US012736677B2

(12) United States Patent
Banas et al.

(10) Patent No.: US 12,736,677 B2
(45) Date of Patent: Sep. 15, 2026

(54) LOCAL OSCILLATOR TAP USING REFLECTION FOR COHERENT LIDAR

(71) Applicant: VELODYNE LIDAR USA, INC., San Jose, CA (US)

(72) Inventors: Tyler Banas, Alameda, CA (US); Sunil Khatana, Sunnyvale, CA (US); Liwei Hua, Los Gatos, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 811 days.

(21) Appl. No.: 18/115,687

(22) Filed: Feb. 28, 2023

(65) Prior Publication Data

US 2024/0288583 A1 Aug. 29, 2024

(51) Int. Cl.

| | |
|---|---|
| ***G01S 17/58*** | (2006.01) |
| ***G01S 7/481*** | (2006.01) |
| ***G01S 7/493*** | (2006.01) |
| ***G01S 17/931*** | (2020.01) |

(52) U.S. Cl.

CPC ............ *G01S 17/58* (2013.01); *G01S 7/4814* (2013.01); *G01S 7/4817* (2013.01); *G01S 7/4818* (2013.01); *G01S 7/493* (2013.01); *G01S 17/931* (2020.01)

(58) Field of Classification Search

CPC ...... G01S 17/58; G01S 7/4814; G01S 7/4817; G01S 7/4818; G01S 7/493; G01S 17/931; G01S 7/4812; G01S 17/34; G01S 17/42

See application file for complete search history.

(56) References Cited

U.S. PATENT DOCUMENTS

| | | | |
|---|---|---|---|
| 6,384,770 | B1 | 5/2002 | de Gouy et al. |
| 8,687,173 | B2 | 4/2014 | Rezk et al. |
| 10,884,130 | B1 | 1/2021 | Viswanatha et al. |
| 10,908,267 | B1 | 2/2021 | Gagne et al. |
| 10,948,598 | B1 | 3/2021 | Prabhakar et al. |

(Continued)

FOREIGN PATENT DOCUMENTS

| | | |
|---|---|---|
| WO | WO-2010030884 A2 | 3/2010 |
| WO | WO-2014081773 A1 | 5/2014 |

(Continued)

OTHER PUBLICATIONS

International Search Report and Written Opinion of the International Searching Authority in Application No. PCT/US2022/28968, mailed Aug. 30, 2022.

*Primary Examiner* — Michael Lee

(74) *Attorney, Agent, or Firm* — Kilpatrick Townsend & Stockton LLP

(57) ABSTRACT

A lidar device includes a laser source configured to emit a transmit beam, an optical scanner that has at least one lens and is configured to transmit a first portion of the transmit beam towards a target and receive a receive beam reflected by the target, and a transmission medium configured to provide a propagation path for the transmit beam and the receive beam. The lidar device also includes a target detection module that is configured to determine a range and/or a velocity of the target based on the receive beam and a second portion of the transmit beam reflected at a media-air interface defined at an end of the transmission medium where the first portion of the transmit beam is launched into air towards the at least one lens of the optical scanner.

17 Claims, 21 Drawing Sheets

(56) References Cited

U.S. PATENT DOCUMENTS

| | | | |
|---|---|---|---|
| 10,969,491 | B1 | 4/2021 | Krause Perin et al. |
| 10,976,415 | B1 | 4/2021 | Gagne et al. |
| 10,983,299 | B2 | 4/2021 | Chen et al. |
| 2018/0003803 | A1 | 1/2018 | Kakani et al. |
| 2019/0257950 | A1 | 8/2019 | Patanwala et al. |
| 2020/0049820 | A1* | 2/2020 | Choi ......................... G01S 7/51 |
| 2020/0081106 | A1 | 3/2020 | Kocaoglu et al. |
| 2020/0135802 | A1 | 4/2020 | Rezk et al. |
| 2020/0158871 | A1 | 5/2020 | Rezk et al. |
| 2020/0241115 | A1* | 7/2020 | Schmalenberg ........ G01S 17/32 |
| 2020/0271784 | A1 | 8/2020 | Bradford et al. |
| 2020/0292706 | A1 | 9/2020 | Hexsel et al. |
| 2020/0300993 | A1 | 9/2020 | Behzadi et al. |
| 2020/0319314 | A1 | 10/2020 | Behzadi et al. |
| 2020/0400798 | A1 | 12/2020 | Rezk et al. |
| 2022/0091242 | A1* | 3/2022 | Gagne ................... G01S 7/4813 |
| 2022/0365184 | A1 | 11/2022 | Khatana et al. |
| 2022/0365185 | A1 | 11/2022 | Khatana et al. |
| 2022/0365190 | A1* | 11/2022 | Nathan ................. G01S 7/4817 |
| 2022/0365213 | A1 | 11/2022 | Khatana et al. |
| 2022/0373681 | A1 | 11/2022 | Khatana et al. |

FOREIGN PATENT DOCUMENTS

| | | | |
|---|---|---|---|
| WO | WO-2020076402 | A1 | 4/2020 |
| WO | WO-2023034939 | A1 | 3/2023 |

* cited by examiner

LOCAL OSCILLATOR TAP USING REFLECTION FOR COHERENT LIDAR

TECHNICAL FIELD

The present disclosure relates generally to lidar technology and, more specifically, to local oscillator (LO) signal generation in coherent lidar systems.

BACKGROUND

Lidar (light detection and ranging) systems measure the attributes of their surrounding environments (e.g., shape of a target, contour of a target, distance to a target, etc.) by illuminating the environment with light (e.g., laser light) and measuring the reflected light with sensors. Differences in laser return times and/or wavelengths can then be used to make digital, three-dimensional ("3D") representations of a surrounding environment. Lidar technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), etc. Depending on the application and associated field of view, multiple optical transmitters and/or optical receivers may be used to produce images in a desired resolution. A lidar system with greater numbers of transmitters and/or receivers can generally generate larger numbers of pixels.

In a multi-channel lidar device, optical transmitters can be paired with optical receivers to form multiple "channels." In operation, each channel's transmitter can emit an optical signal (e.g., laser light) into the device's environment, and the channel's receiver can detect the portion of the signal that is reflected back to the channel's receiver by the surrounding environment. In this way, each channel can provide "point" measurements of the environment, which can be aggregated with the point measurements provided by the other channel(s) to form a "point cloud" of measurements of the environment.

The measurements collected by a lidar channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal (s) reflected by the surface.

In some cases, lidar measurements may be used to determine the reflectance of the surface that reflects an optical signal. The reflectance of a surface may be determined based on the intensity of the return signal, which generally depends not only on the reflectance of the surface but also on the range to the surface, the emitted signal's glancing angle with respect to the surface, the power level of the channel's transmitter, the alignment of the channel's transmitter and receiver, and other factors.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein are improved techniques for generating local oscillator (LO) signals in coherent lidar systems.

At least one aspect of the present disclosure is directed to a lidar device. The lidar device includes a laser source configured to emit a transmit beam, an optical scanner that has at least one lens and is configured to transmit a first portion of the transmit beam towards a target and receive a receive beam reflected by the target, and a transmission medium configured to provide a propagation path for the transmit beam and the receive beam. The lidar device also includes a target detection module that is configured to determine a range and/or a velocity of the target based on the receive beam and a second portion of the transmit beam reflected at a media-air interface defined at an end of the transmission medium where the first portion of the transmit beam is launched into air towards the at least one lens of the optical scanner.

Another aspect of the present disclosure is directed to a vehicle. The vehicle includes at least one lidar device, as described above. Each lidar device is configured to provide navigation and/or mapping for the vehicle and is disposed in an interior of the vehicle and/or on an exterior of the vehicle.

Yet another aspect of the present disclosure is directed to a method of operating a lidar device. The method includes emitting, via a laser source, a transmit beam; transmitting, via an optical scanner that has at least one lens, a first portion of the transmit beam towards a target; and receiving, via the optical scanner, a receive beam reflected by the target. In accordance with the method, a second portion of the transmit beam is reflected at a media-air interface defined at an end of a transmission medium where the first portion of the transmit beam is launched into air towards the at least one lens of the optical scanner. The transmission medium is configured to provide a propagation path for the transmit beam and the receive beam. Also in accordance with the method, a range and/or a velocity of the target is determined via a target detection module based on the receive beam and the second portion of the transmit beam.

Still another aspect of the present disclosure is directed to a method of manufacturing a lidar device. The method includes optically coupling (i) a laser source configured to emit a transmit beam, (ii) an optical scanner that has at least one lens and is configured to transmit a first portion of the transmit beam towards a target and receive a receive beam reflected by the target, and (iii) a transmission medium configured to provide a propagation path for the transmit beam and the receive beam. In accordance with the method, a configuration of a media-air interface defined at an end of the transmission medium where the first portion of the transmit beam is launched into air towards the at least one lens of the optical scanner is adjusted to control at least one characteristic of a second portion of the transmit beam reflected at the media-air interface. Also in accordance with the method, a target detection module is configured to determine a range and/or a velocity of the target based on the receive beam and the second portion of the transmit beam.

Various embodiments of these aspects of the disclosure may include the following features. In some embodiments, the second portion of the transmit beam is used as a local oscillator (LO) signal to determine the range and/or the velocity of the target. In some embodiments, the lidar device includes a mixer configured to mix the receive beam and the second portion of the transmit beam to generate a mixed signal having a beat frequency. In some embodiments, the range and/or the velocity of the target is determined from the beat frequency. In some embodiments, the target detection module is configured to determine a reflectivity of the target based on the receive beam and the second portion of the transmit beam.

In various embodiments, a configuration of the media-air interface is adjustable to control at least one characteristic of the second portion of the transmit beam. In some embodiments, the at least one characteristic of the second portion of the transmit beam includes an intensity of the second portion of the transmit beam. In some embodiments, the configuration of the media-air interface corresponds to a configuration of the transmission medium.

In various embodiments, the media-air interface includes an angled endface of the transmission medium. In some embodiments, the media-air interface includes an angled endface of a connector coupled to the transmission medium. In some embodiments, the media-air interface includes a coating applied to the transmission medium. In some embodiments, the media-air interface includes a grating integrated within the transmission medium. In some embodiments, the grating is a fiber Bragg grating.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
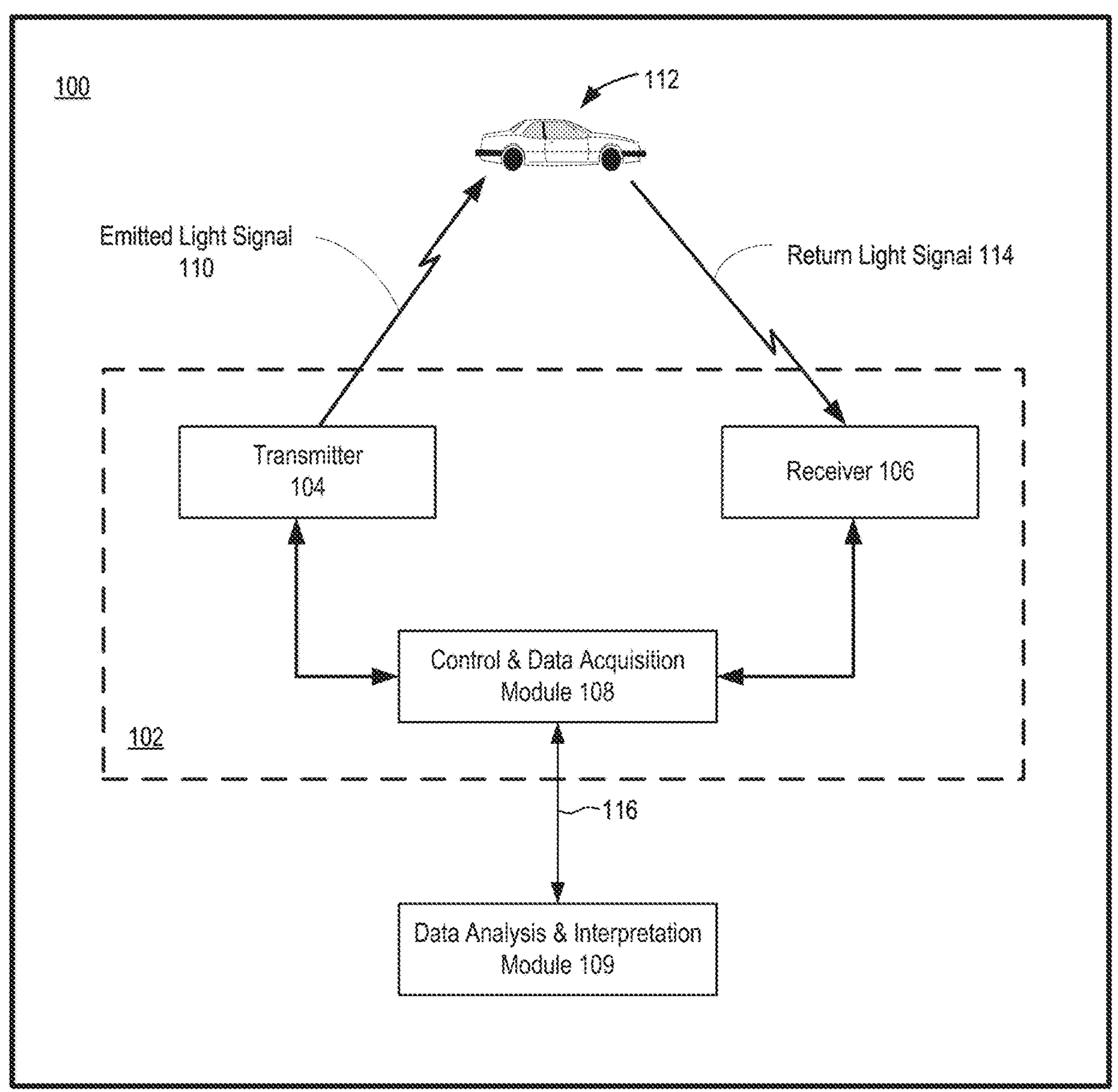
FIG. 1 is an illustration of an exemplary lidar system, in accordance with some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Exemplary systems and methods for improved local oscillator (LO) signal generation in coherent systems are provided herein. In at least one embodiment, an LO signal is generated from a reflection of the transmit laser signal. In one example, the reflection occurs at a media-air interface of the lidar system. In some examples, at least one characteristic of the LO signal can be controlled by adjusting the configuration of the media-air interface. By generating the LO signal without the use of a dedicated component (e.g., a splitter), signal loss in the transmit path can be reduced. In addition, the effects of undesired tones associated with the LO signal and/or with the reflection of the transmit laser signal at the media-air interface can be minimized (or eliminated), improving the resolution and/or accuracy of the lidar system. In some examples, the near range visibility of the lidar system may be improved.

It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Three of the most significant technical challenges faced by the lidar industry are (1) reducing the manufacturing cost for lidar devices while maintaining existing performance levels, (2) improving the reliability of lidar devices under automotive operating conditions (e.g., weather, temperature, and mechanical vibration), and (3) increasing the range of lidar devices. One approach to reducing manufacturing costs is to reduce the amount of hardware (e.g., channels, transmitters, emitters, receivers, detectors, etc.) in the lidar device while increasing the utilization of the remaining hardware to maintain performance levels. One approach to improving device reliability is to develop lidar devices that use fewer moving mechanical parts (e.g., by eliminating or simplifying mechanical beam scanners). One approach to extending range is to develop lidar devices that use solid-state lasers.

Motivation for and Benefits of Some Embodiments

In some cases, coherent lidar systems can avoid the eye safety hazards commonly associated with pulsed lidar systems (e.g., hazards that arise from transmitting optical signals with high peak power). In addition, coherent detection may be more sensitive than direct detection and can offer better performance, including single-pulse velocity measurement and greater immunity to interference from solar glare and other light sources, including other lidar systems and devices.

However, coherent lidar systems typically rely on the use of beam splitting components (e.g., splitters, couplers, etc.) to generate local oscillator (LO) signals. The losses associated with said beam splitting components can reduce the efficiency and performance of coherent lidar systems. As such, the efficiency and/or performance of coherent lidar systems may be improved by generating the LO signal without the use of a dedicated component (e.g., a splitter).

Some Examples of LiDAR Systems

A lidar system may be used to measure the shape and contour of the environment surrounding the system. Lidar systems may be applied to numerous applications including autonomous navigation and aerial mapping of surfaces. In general, a lidar system emits light that is subsequently reflected by objects within the environment in which the system operates. The light may be emitted by a laser (e.g., a rapidly firing laser). Laser light travels through a medium and reflects off points of surfaces in the environment (e.g., surfaces of buildings, tree branches, vehicles, etc.). The reflected (and/or scattered) light energy returns to a lidar detector where it may be sensed and used to perceive the environment.

The science of lidar systems is based on the physics of light and optics. Any suitable measurement techniques may be used to determine the attributes of objects in a lidar system's environment. In some examples, the lidar system is configured to emit light pulses (e.g., individual pulses or sequences of pulses). The time each pulse (or pulse sequence) travels from being emitted to being received ("time of flight" or "TOF") may be measured to determine the distance between the lidar system and the object that reflects the pulse. Lidar systems that operate in this way may be referred to as "pulsed lidar," "TOF lidar," "direct TOF lidar," or "pulsed TOF lidar." In some other examples, the time of flight may be calculated indirectly (e.g., using amplitude-modulated continuous wave (AMCW) structured light). Lidar systems that operate in this way may be referred to as "indirect TOF lidar" or "iTOF lidar." In still other examples, the lidar system can be configured to emit continuous wave (CW) light. The wavelength (or frequency) of the received, reflected light may be measured to determine the distance between the lidar system and the object that reflects the light. In some examples, lidar systems can measure the speed (or velocity) of objects. Lidar systems that operate in this way may be referred to as "coherent lidar," "continuous wave lidar," or "CW lidar." In a CW lidar system, any suitable variant of CW lidar sensing may be used. For example, frequency modulated continuous wave (FMCW) lidar sensing may be used.

FIG. 1 depicts the operation of a lidar system 100, according to some embodiments. In the example of FIG. 1, the lidar system 100 includes a lidar device 102, which may include a transmitter 104 that generates and emits a light signal 110, a receiver 106 that detects and processes a return light signal 114, and a control & data acquisition module 108. The transmitter 104 may include a light source (e.g., "optical emitter" or "emitter"), electrical components operable to activate (e.g., drive) and deactivate the light source in response to electrical control signals, and optical components adapted to shape and redirect the light emitted by the light source. The receiver 106 may include a light detector (e.g., "optical detector," "photodetector," or "detector") and optical components adapted to shape return light signals 114 and direct those signals to the detector. In some implementations, one or more optical components (e.g., lenses, mirrors, etc.) may be shared by the transmitter and the receiver.

The lidar device 102 may be referred to as a lidar transceiver or "channel." In operation, the emitted light signal 110 propagates through a medium and reflects off an object(s) 112, whereby a return light signal 114 propagates through the medium and is received by receiver 106. In one example, each lidar channel may correspond to a physical mapping of a single emitter to a single detector (e.g., a one-to-one pairing of a particular emitter and a particular detector). In other examples, however, each lidar channel may correspond to a physical mapping of multiple emitters to a single detector or a physical mapping of a single emitter to multiple detectors (e.g., a "flash" configuration). In some examples, a lidar system 100 may have no fixed channels; rather, light emitted by one or more emitters may be detected by one or more detectors without any physical or persistent mapping of specific emitters to specific detectors.

Any suitable light source may be used including, without limitation, one or more gas lasers, chemical lasers, metal-vapor lasers, solid-state lasers (SSLs) (e.g., Q-switched SSLs, Q-switched solid-state bulk lasers, etc.), fiber lasers (e.g., Q-switched fiber lasers), liquid lasers (e.g., dye lasers), semiconductor lasers (e.g., laser diodes, edge emitting lasers (EELs), vertical-cavity surface emitting lasers (VCSELs), quantum cascade lasers, quantum dot lasers, quantum well lasers, hybrid silicon lasers, optically pumped semiconductor lasers, etc.), and/or any other device operable to emit light. For semiconductor lasers, any suitable gain medium may be used including, without limitation, gallium nitride (GaN), indium gallium nitride (InGaN), aluminum gallium indium phosphide (AlGaInP), aluminum gallium arsenide (AlGaAs), indium gallium arsenide phosphide (InGaAsP), lead salt, etc. For Q-switched lasers, any suitable type or variant of Q-switching can be used including, without limitation, active Q-switching, passive Q-switching, cavity dumping, regenerative Q-switching, etc. The light source may emit light having any suitable wavelength or wavelengths, including but not limited to wavelengths between 100 nm (or less) and 1 mm (or more). Semiconductor lasers operable to emit light having wavelengths of approximately 905 nm, 1300 nm, or 1550 nm are widely commercially available. In some examples, the light source may be operated as a pulsed laser, a continuous-wave (CW) laser, and/or a coherent laser. A light signal (e.g., "optical signal") 110 emitted by a light source may consist of a single pulse, may include a sequence of two or more pulses, or may be a continuous wave.

A lidar system 100 may use any suitable illumination technique to illuminate the system's field of view (FOV). In some examples, the lidar system 100 may illuminate the entire FOV simultaneously. Such illumination techniques may be referred to herein as "flood illumination" or "flash illumination." In some examples, the lidar system 100 may illuminate fixed, discrete spots throughout the FOV simultaneously. Such illumination techniques may be referred to herein as "fixed spot illumination." In some examples, the lidar system 100 may illuminate a line within the FOV and use a scanner (e.g., a 1D scanner) to scan the line over the entire FOV. Such illumination techniques may be referred to herein as "scanned line illumination." In some examples, the lidar system 100 may simultaneously illuminate one or more spots within the FOV and use a scanner (e.g., a 1D or 2D scanner) to scan the spots over the entire FOV. Such illumination techniques may be referred to herein as "scanned spot illumination."

Any suitable optical detector may be used including, without limitation, one or more photodetectors, contact image sensors (CIS), solid-state photodetectors (e.g., photodiodes (PD), single-photon avalanche diode (SPADs), avalanche photodiodes (APDs), etc.), photomultipliers (e.g., silicon photomultipliers (SiPMs), and/or any other device operable to convert light (e.g., optical signals) into electrical signals. In some examples, CIS can be fabricated using a complementary metal-oxide semiconductor (CMOS) process. In some examples, solid-state photodetectors can be fabricated using semiconductor processes similar to CMOS. Such semiconductor processes may use silicon, germanium, indium gallium arsenide, lead (II) sulfide, mercury cadmium, telluride, $MoS_2$, graphene, and/or any other suitable material(s). In some examples, an array of integrated or discrete CIS or solid-state photodetectors can be used to simultaneously image (e.g., perform optical detection across) the lidar device's entire field of view or a portion thereof. In general, solid-state photodetectors may be configured to detect light having wavelengths between 190 nm (or lower) and 1.4 μm (or higher). PDs and APDs configured to detect light having wavelengths of approximately 905 nm, 1300 nm, or 1550 nm are widely commercially available.

The lidar system 100 may include any suitable combination of measurement technique(s), light source(s), illumination technique(s), and detector(s). Some combinations may be more accurate or more economical on certain conditions. For example, some combinations may be more economical for short-range sensing but incapable of provide accurate measurements at longer ranges. Some combinations may pose potential hazards to eye safety, while other combinations may reduce such hazards to negligible levels.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 or the receiver 106 determines (e.g., measures) particular characteristics of the return light signal 114 detected by the receiver 106. For example, the control & data acquisition module 108 or receiver 106 may measure the intensity of the return light signal 114 using any suitable technique.

Operational parameters of the transceiver 102 may include its horizontal field of view ("FOV") and its vertical FOV. The FOV parameters effectively define the region of the environment that is visible to the specific lidar transceiver 102. More generally, the horizontal and vertical FOVs of a lidar system 100 may be defined by combining the fields of view of a plurality of lidar devices 102.

To obtain measurements of points in its environment and generate a point cloud based on those measurements, a lidar system 100 may scan its FOV. A lidar transceiver system 100 may include one or more beam-steering components (not shown) to redirect and shape the emitted light signals 110 and/or the return light signals 114. Any suitable beam-steering components may be used including, without limitation, mechanical beam steering components (e.g., rotating assemblies that physically rotate the transceiver(s) 102, rotating scan mirrors that deflect emitted light signals 110 and/or return light signals 114, etc.), optical beam steering components (e.g., lenses, lens arrays, microlenses, microlens arrays, beam splitters, etc.), microelectromechanical (MEMS) beam steering components (e.g., MEMS scan mirrors, etc.), solid-state beam steering components (e.g., optical phased arrays, optical frequency diversity arrays, etc.), etc.

In some implementations, the lidar system 100 may include or be communicatively coupled to a data analysis & interpretation module 109, which may receive outputs (e.g., via a connection 116) from the control & data acquisition module 108 and may perform data analysis on those outputs. By way of example and not limitation, connection 116 may be implemented using wired or wireless (e.g., non-contact communication) technique(s).

Figure 2A:
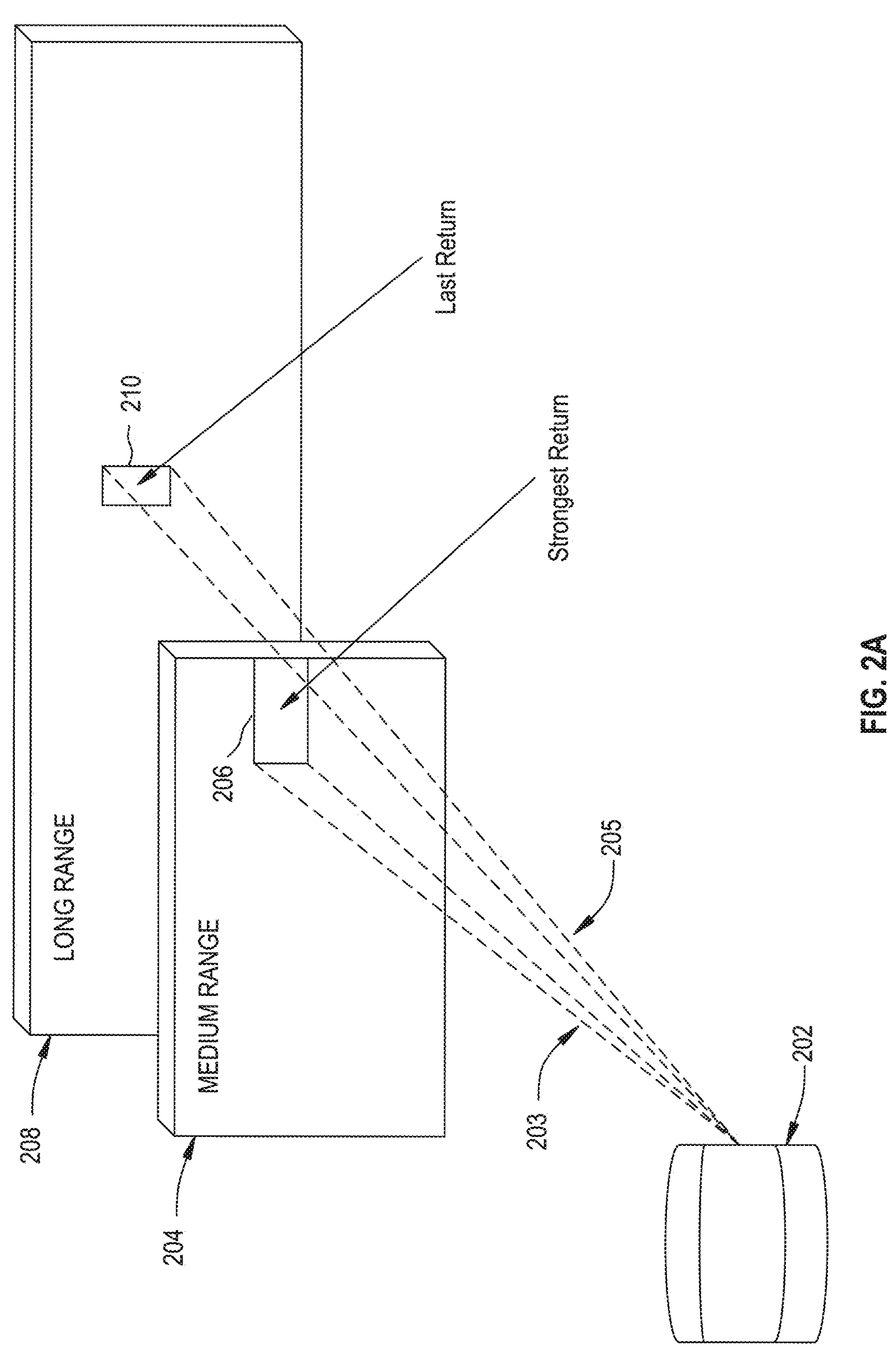
FIG. 2A is an illustration of the operation of a lidar system, in accordance with some embodiments.

FIG. 2A illustrates the operation of a lidar system 202, in accordance with some embodiments. In the example of FIG. 2A, two return light signals 203 and 205 are shown. Because laser beams generally tend to diverge as they travel through a medium, a single laser emission may hit multiple objects at different ranges from the lidar system 202, producing multiple return signals 203, 205. The lidar system 202 may analyze multiple return signals 203, 205 and report one of the return signals (e.g., the strongest return signal, the last return signal, etc.) or more than one (e.g., all) of the return signals. In the example of FIG. 2A, lidar system 202 emits laser light in the direction of near wall 204 and far wall 208. As illustrated, the majority of the emitted light hits the near wall 204 at area 206 resulting in a return signal 203, and another portion of the emitted light hits the far wall 208 at area 210 resulting in a return signal 205. Return signal 203 may have a shorter TOF and a stronger received signal strength compared to return signal 205. In both single- and multiple-return lidar systems, it is important that each return signal is accurately associated with the transmitted light signal so that one or more attributes of the object reflecting the light signal (e.g., range, velocity, reflectance, etc.) can be correctly estimated.

Some embodiments of a lidar system may capture distance data in a two-dimensional ("2D") (e.g., within a single plane) point cloud manner. These lidar systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the lidar system to achieve 90-180-360 degrees of azimuth (horizontal) view while simplifying both the system design and manufacturability. Many applications require more data than just a 2D plane. The 2D point cloud may be expanded to form a 3D point cloud, in which multiple 2D point clouds are used, each corresponding to a different elevation (e.g., a different position and/or direction with respect to a vertical axis). Operational parameters of the receiver of a lidar system may include the horizontal FOV and the vertical FOV.

Figure 2B:
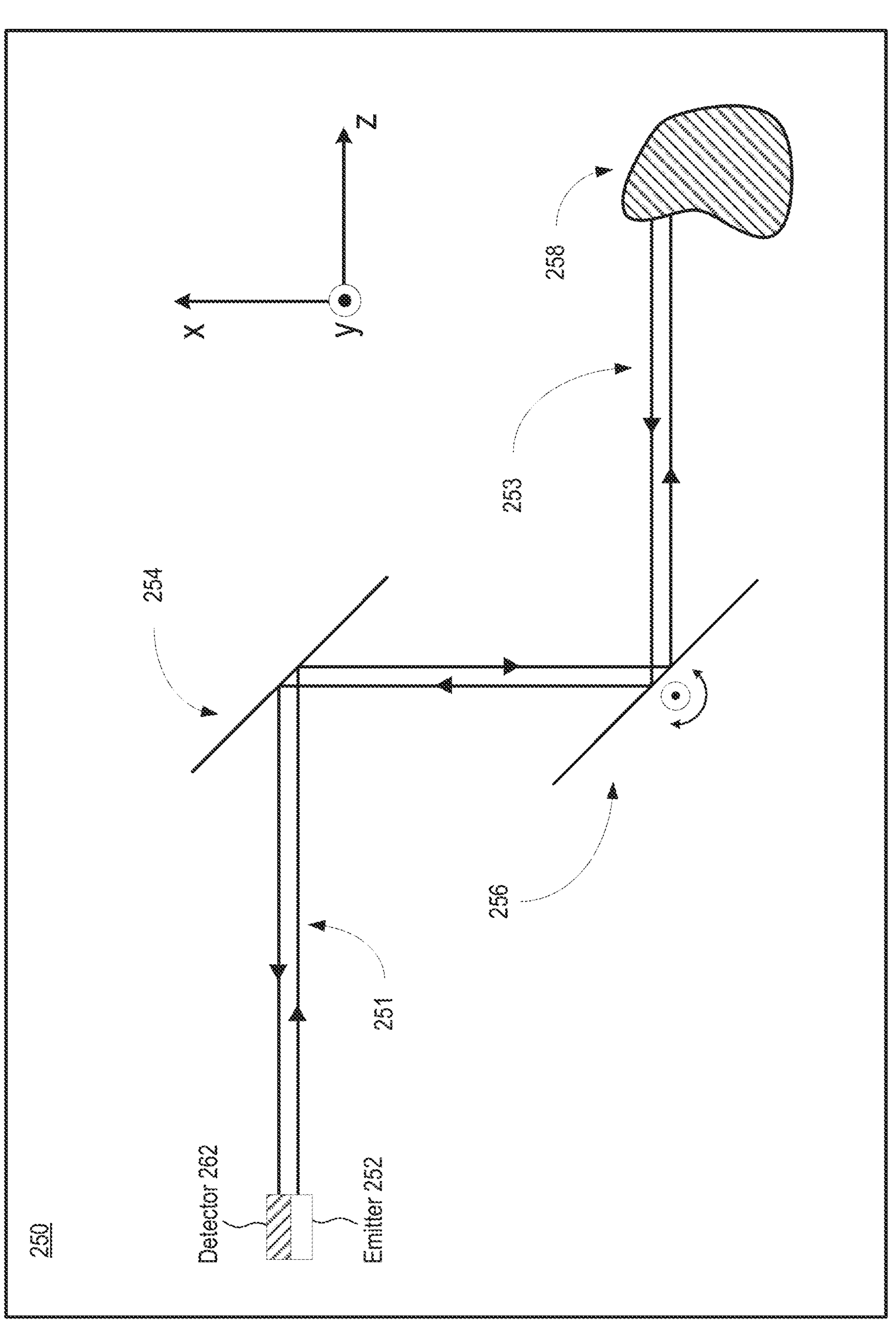
FIG. 2B is an illustration of optical components of a channel of a lidar system with a movable mirror, in accordance with some embodiments.

FIG. 2B depicts a lidar system 250 with a movable (e.g., rotating or oscillating) mirror, according to some embodiments. In the example of FIG. 2B, the lidar system 250 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The emitted laser signal 251 may be directed to a fixed mirror 254, which may reflect the emitted laser signal 251 to the movable mirror 256. As movable mirror 256 moves (e.g., oscillates), the emitted laser signal 251 may reflect off an object 258 in its propagation path. The reflected return signal 253 may be coupled to the detector 262 via the movable mirror 256 and the fixed mirror 254. In some embodiments, the movable mirror 256 is implemented with mechanical technology or with solid state technology (e.g., MEMS).

Figure 2C:
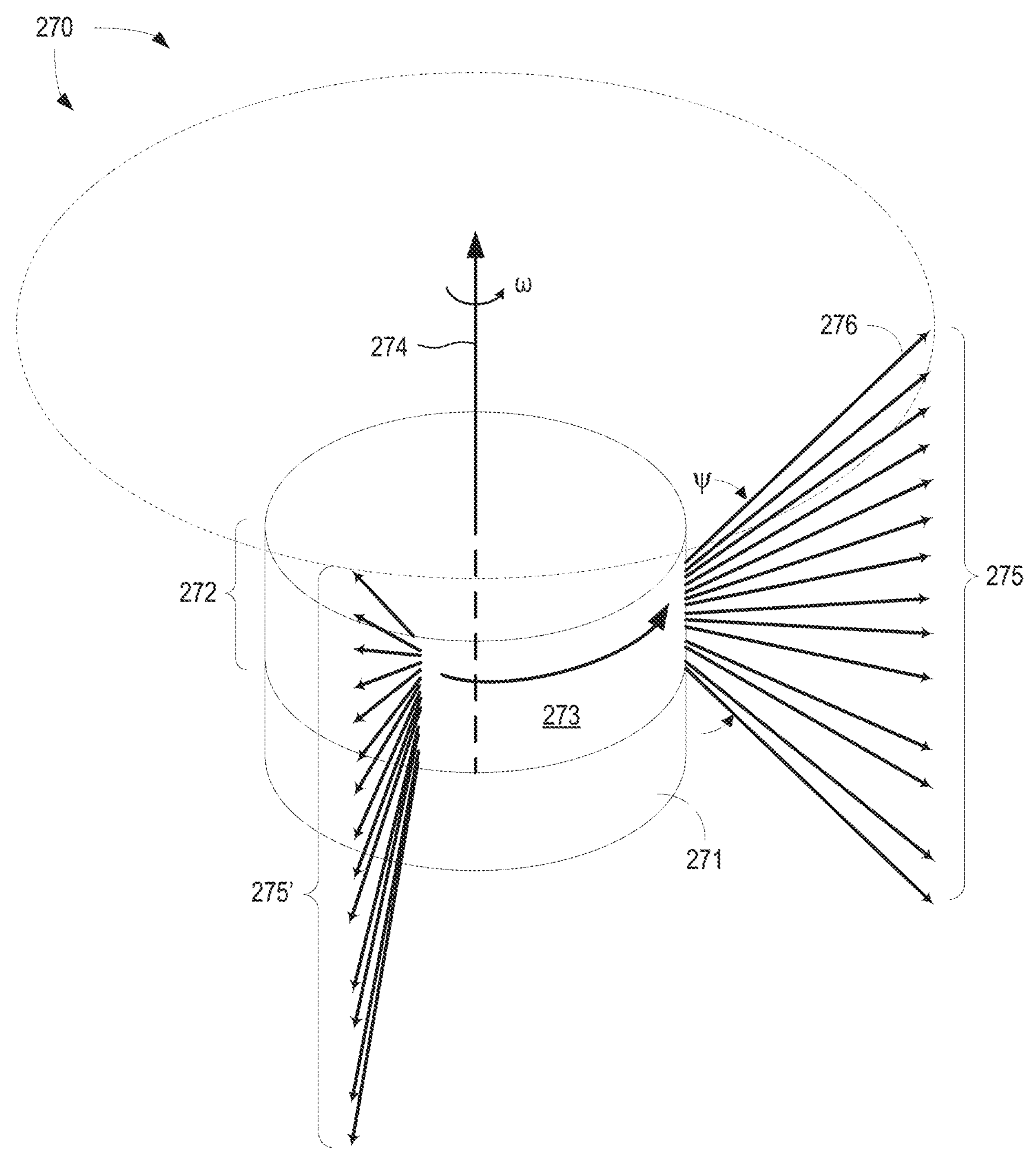
FIG. 2C is an illustration of an example of a 3D lidar system, in accordance with some embodiments.

FIG. 2C depicts a 3D lidar system 270, according to some embodiments. In the example of FIG. 2C, the 3D lidar system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D lidar system 270 includes a lidar transceiver, such as transceiver 102 shown in FIG. 1, operable to emit laser beams 276 through the cylindrical shell element 273 of the upper housing 272. In the example of FIG. 2C, each individual arrow in the sets of arrows 275, 275' directed outward from the 3D lidar system 270 represents a laser beam 276 emitted by the 3D lidar system. Each beam of light emitted from the system 270 (e.g., each laser beam 276) may diverge slightly, such that each beam of emitted light forms a cone of light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D lidar system 270. The direction of each emitted beam may be determined by the angular orientation ω of the transceiver's transmitter 104 with respect to the system's central axis 274 and by the angular orientation ψ of the transmitter's movable mirror (e.g., similar or identical to movable mirror 256 shown in FIG. 2B) with respect to the mirror's axis of oscillation (or rotation). For example, the direction of an emitted beam in a horizontal dimension may be determined by the transmitter's angular orientation ω, and the direction of the emitted beam in a vertical dimension may be determined by the angular orientation ψ of the transmitter's movable mirror. Alternatively, the direction of an emitted beam in a vertical dimension may be determined the transmitter's angular orientation ω, and the direction of the emitted beam in a horizontal dimension may be determined by the angular orientation ψ of the transmitter's movable mirror. (For purposes of illustration, the beams of light 275 are illustrated in one angular orientation relative to a non-rotating coordinate frame of the 3D lidar system 270 and the beams of light 275' are illustrated in another angular orientation relative to the non-rotating coordinate frame.)

The 3D lidar system 270 may scan a particular point (e.g., pixel) in its field of view by adjusting the angular orientation ω of the transmitter and the angular orientation ψ of the transmitter's movable mirror to the desired scan point (ω, ψ) and emitting a laser beam from the transmitter 104. Accordingly, the 3D lidar system 270 may systematically scan its field of view by adjusting the angular orientation ω of the transmitter and the angular orientation ψ of the transmitter's movable mirror to a set of scan points ($\omega_i$, $\psi_j$) and emitting a laser beam from the transmitter 104 at each of the scan points.

Assuming that the optical component(s) (e.g., movable mirror 256) of a lidar transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location L0 on the detector. This time period is referred to herein as the "ranging period" or "listening period" of the scan point associated with the transmitted beam 110 and the return beam 114.

In many lidar systems, the optical component(s) of a lidar transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location L0 of the spot that would have been formed absent the intervening rotation of the optical component(s) during the ranging period is referred to herein as "walk-off."

Figure 2D:
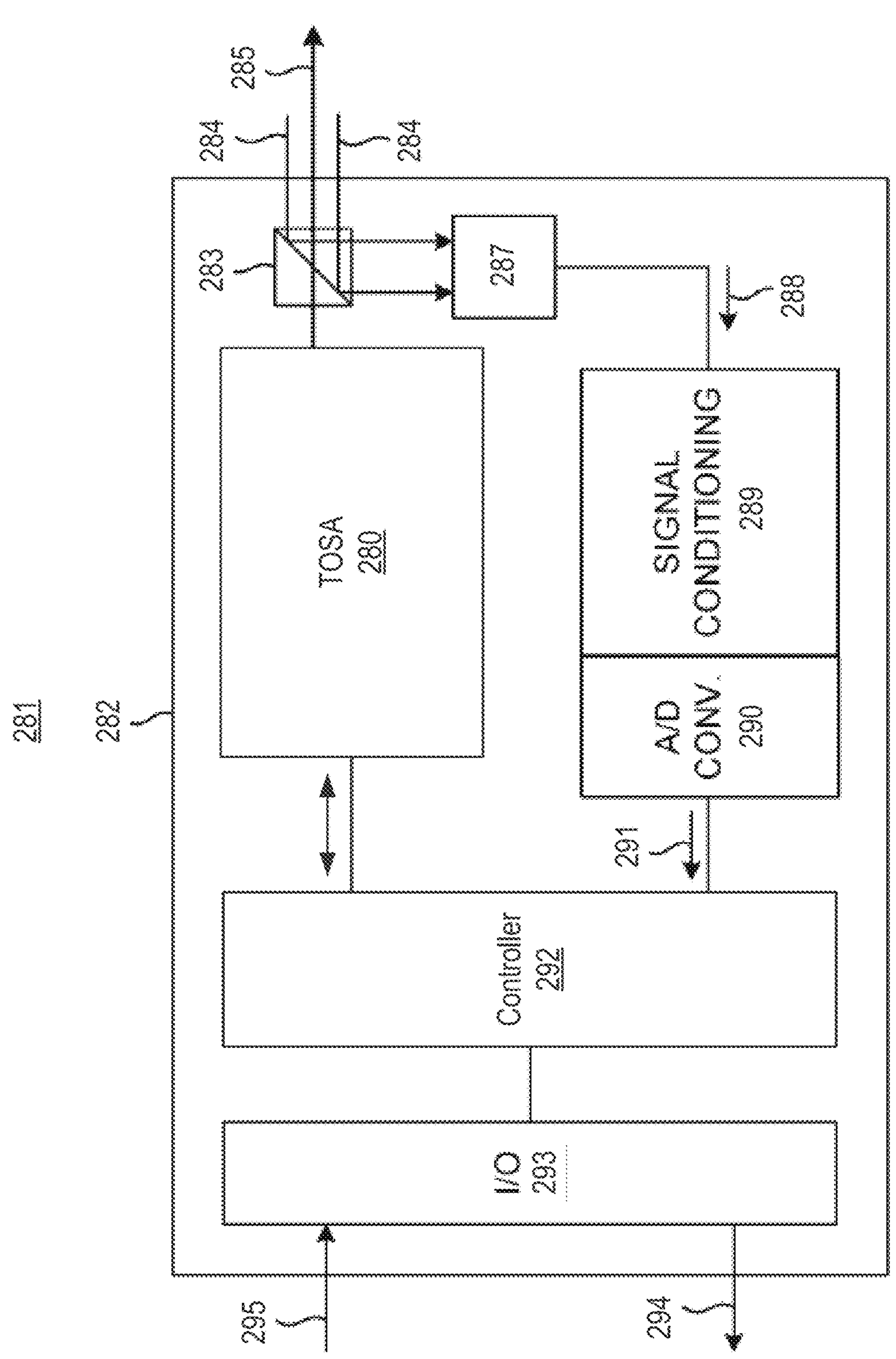
FIG. 2D is a block diagram of a transmitter-receiver optical sub-assembly (TROSA), according to some embodiments.

Referring to FIG. 2D, a block diagram of a transmitter-receiver optical subassembly (TROSA) 281 is shown, according to some embodiments. In some embodiments, the TROSA 281 may include a TOSA 280, an optical detector 287, a beam splitter 283, signal conditioning electronics 289, an analog to digital (A/D) converter 290, controller 292, and digital input/output (I/O) electronics 293. In some embodiments, the TROSA components illustrated in FIG. 2D are integrated onto a common substrate 282 (e.g., printed circuit board, ceramic substrate, etc.). In some embodiments, the TROSA components illustrated in FIG. 2D are individually mounted to a common substrate 282. In some embodiments, groups of these components are packaged together and the integrated package(s) is/are mounted to the common substrate.

The TOSA 280 may include one or more light sources and may operate the light source(s) safely within specified safety thresholds. A light source of the TOSA may emit an optical signal (e.g., laser beam) 285.

A return signal 284 may be detected by the TROSA 281 in response to the optical signal 285 illuminating a particular location. For example, the optical detector 287 may detect the return signal 284 and generate an electrical signal 288 based on the return signal 284. The controller 292 may initiate a measurement window (e.g., a period of time during which collected return signal data are associated with a particular emitted light signal 285) by enabling data acquisition by optical detector 287. Controller 292 may control the timing of the measurement window to correspond with the period of time when a return signal is expected in response to the emission of an optical signal 285. In some examples, the measurement window is enabled at the time when the optical signal 285 is emitted and is disabled after a time period corresponding to the time of flight of light over a distance that is substantially twice the range of the lidar device in which the TROSA 281 operates. In this manner, the measurement window is open to collect return light from objects adjacent to the lidar device (e.g., negligible time of flight), objects that are located at the maximum range of the lidar device, and objects in between. In this manner, other light that does not contribute to a useful return signal may be rejected.

In some embodiments, the signal analysis of the electrical signal 288 produced by the optical detector 287 is performed by the controller 292, entirely. In such embodiments, the signals 294 provided by the TROSA 281 may include an indication of the distances determined by controller 292. In some embodiments, the signals 294 include the digital signals 291 generated by the A/D converter 290. These raw measurement signals 291 may be processed further by one or more processors located on board the lidar device or external to the lidar device to arrive at a measurement of distance. In some embodiments, the controller 292 performs preliminary signal processing steps on the signals 291 and the signals 294 include processed data that are further processed by one or more processors located on board the lidar device or external to the lidar device to arrive at a measurement of distance.

In some embodiments a lidar device (e.g., a lidar device 100, 202, 250, or 270) includes multiple TROSAs 281. In some embodiments, a delay time is enforced between the firing of each TROSA and/or between the firing of different light sources within the same TROSA. In some examples, the delay time is greater than the time of flight of the light signal 285 to and from an object located at the maximum range of the lidar device, to reduce or avoid optical cross-talk among any of the TROSAs 281. In some other examples, an optical signal 285 is emitted from one TROSA 281 before a return signal corresponding to a light signal emitted from another TROSA 281 has had time to return to the lidar device. In these embodiments, there may be sufficient spatial separation between the areas of the surrounding environment interrogated by the light signals of these TROSAs to avoid optical cross-talk.

In some embodiments, digital I/O 293, A/D converter 290, and signal conditioning electronics 289 are integrated onto a single, silicon-based microelectronic chip. In another embodiment, these same elements are integrated into a single gallium-nitride or silicon based circuit that also includes components of the TOSA 280 (e.g., an illumination driver). In some embodiments, the A/D converter 290 and controller 292 are combined as a time-to-digital converter.

As depicted in FIG. 2D, return light 284 reflected from the surrounding environment is detected by optical detector 287. In some embodiments, optical detector 287 includes one or more avalanche photodiodes (APDs) and/or single-photon avalanche diodes (SPADs). Any suitable optical detector may be used. In some embodiments, optical detector 287 generates an output signal 288 that is amplified by signal conditioning electronics 289. In some embodiments, signal conditioning electronics 289 include an analog trans-impedance amplifier. However, in general, the amplification of output signal 288 may include multiple amplifier stages. In this sense, an analog transimpedance amplifier is provided by way of non-limiting example, as many other analog signal amplification schemes may be used.

In some embodiments, the amplified signal is communicated to A/D converter 290, and the digital signals generated by the A/D converter are communicated to controller 292. Controller 292 may generate an enable/disable signal to control the timing of data acquisition by ADC 290.

As depicted in FIG. 2D, the optical signal 285 emitted from the TROSA 281 and the return signal 284 directed toward the TROSA 281 share a common path within the lidar device. In the embodiment depicted in FIG. 2D, the return light 284 is separated from the emitted light 285 by a beam splitter 283. The beam splitter may direct the light 285 emitted by the TOSA 280 toward the lidar device's environment, and direct the return light 284 to the optical detector 287. Any suitable beam splitter may be used, including (without limitation) a polarizing beam splitter, nonpolarizing beam splitter, dielectric film, etc.). Some non-limiting examples of suitable beam splitters are described in International Patent Publication No. WO 2017/164989.

Some Examples of Continuous Wave (CW) Lidar Systems

As discussed above, some lidar systems may use a continuous wave (CW) laser to detect the range and/or velocity of targets, rather than pulsed TOF techniques. Such systems include continuous wave (CW) coherent lidar systems and frequency modulated continuous wave (FMCW) coherent lidar systems. For example, any of the lidar systems 100, 202, 250, and 270 described above can be configured to operate as a CW coherent lidar system or an FMCW coherent lidar system.

Lidar systems configured to operate as CW or FMCW systems can avoid the eye safety hazards commonly associated with pulsed lidar systems (e.g., hazards that arise from transmitting optical signals with high peak power). In addition, coherent detection may be more sensitive than direct detection and can offer better performance, including single-pulse velocity measurement and immunity to interference from solar glare and other light sources, including other lidar systems and devices.

Figure 3:
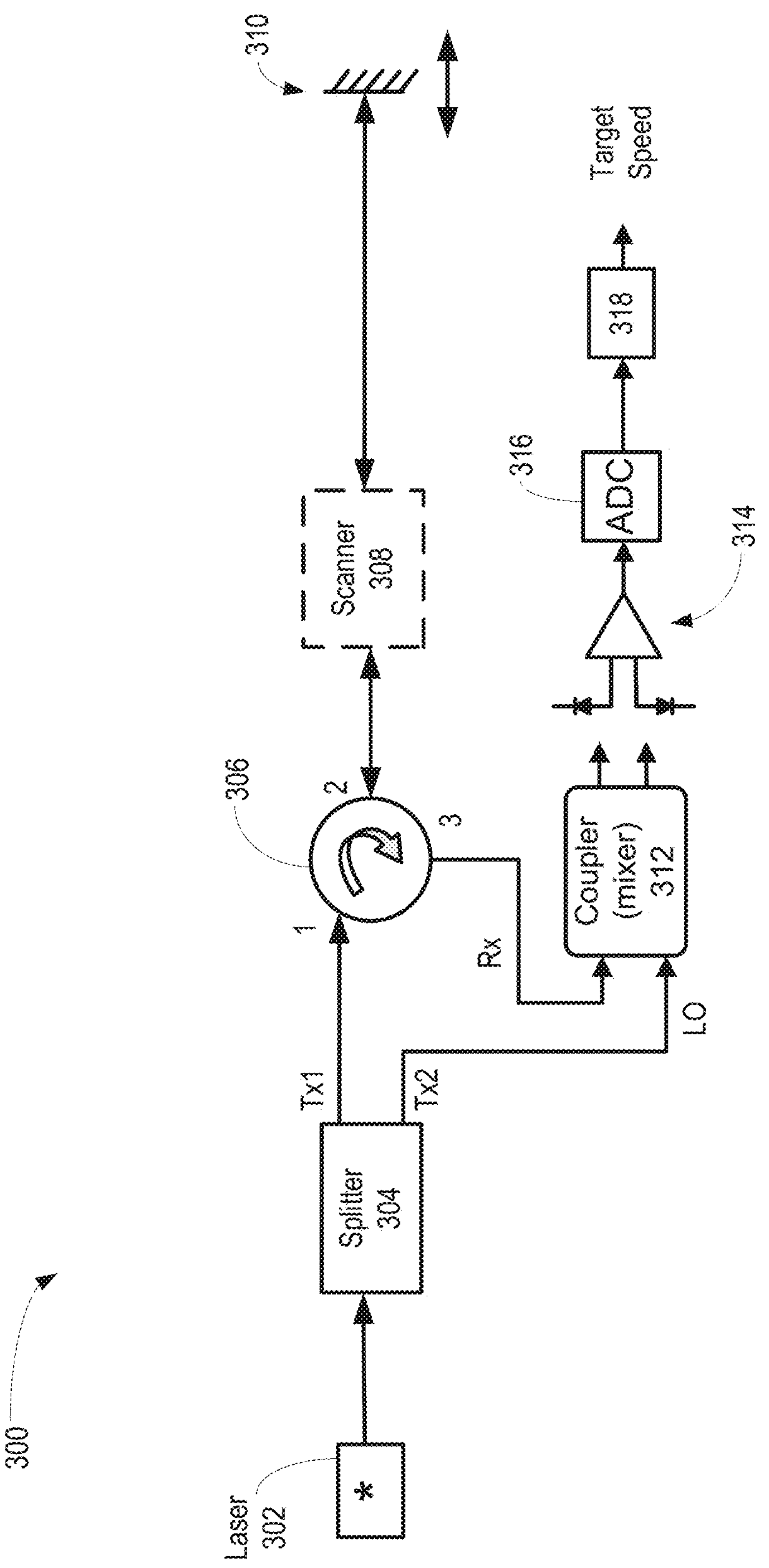
FIG. 3 is an illustration of an example continuous wave (CW) coherent lidar system, in accordance with some embodiments.

FIG. 3 illustrates an exemplary CW coherent lidar system 300 configured to determine the radial velocity (or speed) of a target. Lidar system 300 includes a laser 302 configured to produce a laser signal which is provided to a splitter 304. The laser 302 may provide a laser signal having a substantially constant laser frequency.

In one example, the splitter 304 provides a first split laser signal Tx1 to a direction selective device 306, which provides (e.g., forwards) the signal Tx1 to a scanner 308. In some examples, the direction selective device 306 is a circulator. The scanner 308 uses the first laser signal Tx1 to transmit light emitted by the laser 302 and receives light reflected by the target 310 (e.g., "reflected light" or "reflections"). The reflected light signal Rx is provided (e.g., passed back) to the direction selective device 306. The second laser signal Tx2 (provided by the splitter 304) and the reflected light signal Rx are provided to a coupler (also referred to as a mixer) 312. The mixer may use the second laser signal Tx2 as a local oscillator (LO) signal and mix it with the reflected light signal Rx. The mixer 312 may be configured to mix the reflected light signal Rx with the local oscillator signal LO. The mixer 312 may provide the mixed optical signal to differential photodetector 314, which may generate an electrical signal representing the beat frequency $f_{beat}$ of the mixed optical signals, where $f_{beat}=|f_{Tx2}-f_{Rx}|$ (the absolute value of the difference between the frequencies of the mixed optical signals). In some embodiments, the current produced by the differential photodetector 314 based on the mixed light may have the same frequency as the beat frequency $f_{beat}$. The current may be converted to a voltage by an amplifier (e.g., a transimpedance amplifier (TIA)), which may be provided (e.g., fed) to an analog-to-digital converter (ADC) 316 configured to convert the analog voltage signal to digital samples for a target detection module 318. The target detection module 318 may be configured to determine (e.g., calculate) the radial velocity of the target 310 based on the digital sampled signal with the beat frequency $f_{beat}$.

In one example, the target detection module 318 may identify Doppler frequency shifts using the beat frequency $f_{beat}$ and determine the radial velocity of the target 310 based on those shifts. For example, the radial velocity of the target 310 can be calculated using the following relationship:

$$f_d = \frac{2}{\lambda} v_t$$

where, $f_d$ is the Doppler frequency shift, $\lambda$ is the wavelength of the laser signal, and $v_t$ is the radial velocity of the target 310. In some examples, the direction of the target 310 is indicated by the sign of the Doppler frequency shift $f_d$. For example, a positive signed Doppler frequency shift may indicate that the target 310 is traveling towards the system 300 and a negative signed Doppler frequency shift may indicate that the target 310 is traveling away from the system 300.

In one example, a Fourier Transform calculation is performed using the digital samples from the ADC 316 to recover the desired frequency content (e.g., the Doppler frequency shift) from the digital sampled signal. For example, a controller (e.g., target detection module 318) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the lidar system 300 is described above as being configured to determine the radial velocity of a target, it should be appreciated that the system can be configured to determine the range and/or radial velocity of a target. For example, the lidar system 300 can be modified to use laser chirps to detect the velocity and/or range of a target.

Some examples have been described in which a DFT is used to generate points of a point cloud based on a group of samples. However, frequency analysis techniques (e.g., spectrum analysis techniques) other than the DFT may be used to generate points of a point cloud based on a group of samples. Any suitable frequency analysis technique may be used, including, without limitation, Discrete Cosine transform (DCT), Wavelet transform, Auto-Regressive moving average (ARMA), etc.

Figure 4:
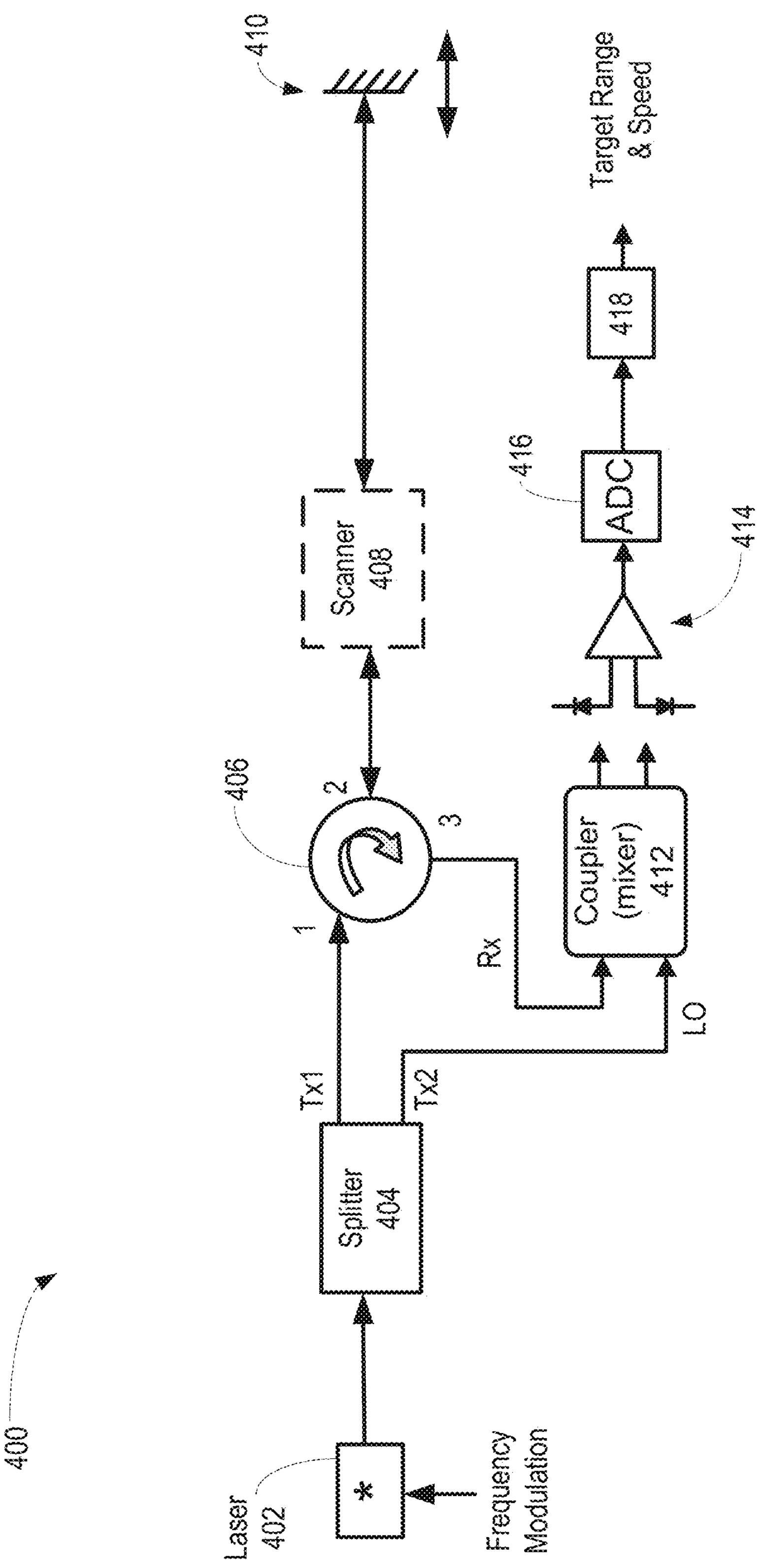
FIG. 4 is an illustration of an example frequency modulated continuous wave (FMCW) coherent lidar system, in accordance with some embodiments.

FIG. 4 illustrates an exemplary FMCW coherent lidar system 400 configured to determine the range and/or radial velocity of a target. Lidar system 400 includes a laser 402 configured to produce a laser signal which is fed into a splitter 404. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 402; however, in other examples, an external modulator can be placed between the laser source 402 and the splitter 404.

In other examples, the laser frequency can be "chirped" by modulating the phase of the laser signal (or light) produced by the laser 402. In one example, the phase of the laser signal is modulated using an external modulator placed between the laser source 402 and the splitter 404; however, in some examples, the laser source 402 may be modulated directly by changing operating parameters (e.g., current/voltage) or may include an internal modulator. Similar to frequency chirping, the phase of the laser signal can be increased ("ramped up") or decreased ("ramped down") over time.

Some examples of systems with FMCW-based lidar sensors have been described. However, some embodiments of the techniques described herein may be implemented using any suitable type of lidar sensors including, without limitation, any suitable type of coherent lidar sensors (e.g., phase-modulated coherent lidar sensors). With phase-modulated coherent lidar sensors, rather than chirping the frequency of the light produced by the laser (as described above with reference to FMCW techniques), the lidar system may use a phase modulator placed between the laser 402 and the splitter 404 to generate a discrete phase modulated signal, which may be used to measure range and radial velocity.

As shown, the splitter 404 provides a first split laser signal Tx1 to a direction selective device 406, which provides (e.g., forwards) the signal Tx1 to a scanner 408. The scanner 408 uses the first laser signal Tx1 to transmit light emitted by the laser 402 and receives light reflected by the target 410. The reflected light signal Rx is provided (e.g., passed back) to the direction selective device 406. The second laser signal Tx2 and reflected light signal Rx are provided to a coupler (also referred to as a mixer) 412. The mixer may use the second laser signal Tx2 as a local oscillator (LO) signal and mix it with the reflected light signal Rx. The mixer 412 may be configured to mix the reflected light signal Rx with the local oscillator signal LO to generate a beat frequency $f_{beat}$. The mixed signal with beat frequency $f_{beat}$ may be provided to a differential photodetector 414 configured to produce a current based on the received light. The current may be converted to voltage by an amplifier (e.g., a transimpedance amplifier (TIA)), which may be provided (e.g., fed) to an analog-to-digital converter (ADC) 416 configured to convert the analog voltage to digital samples for a target detection module 418. The target detection module 418 may be configured to determine (e.g., calculate) the range and/or radial velocity of the target 410 based on the digital sample signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution: } \Delta R = \frac{c}{2BW}$$

(given a perfectly linear chirp), and $$\text{Range: } R = \frac{f_{beat} c T_{chirpRamp}}{2BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent lidar systems may rely on two measurements having different slopes (e.g., negative and positive slopes) to remove this ambiguity. The two measurements having different slopes may also be used to determine range and velocity measurements simultaneously.

Figures 5A, 5B:
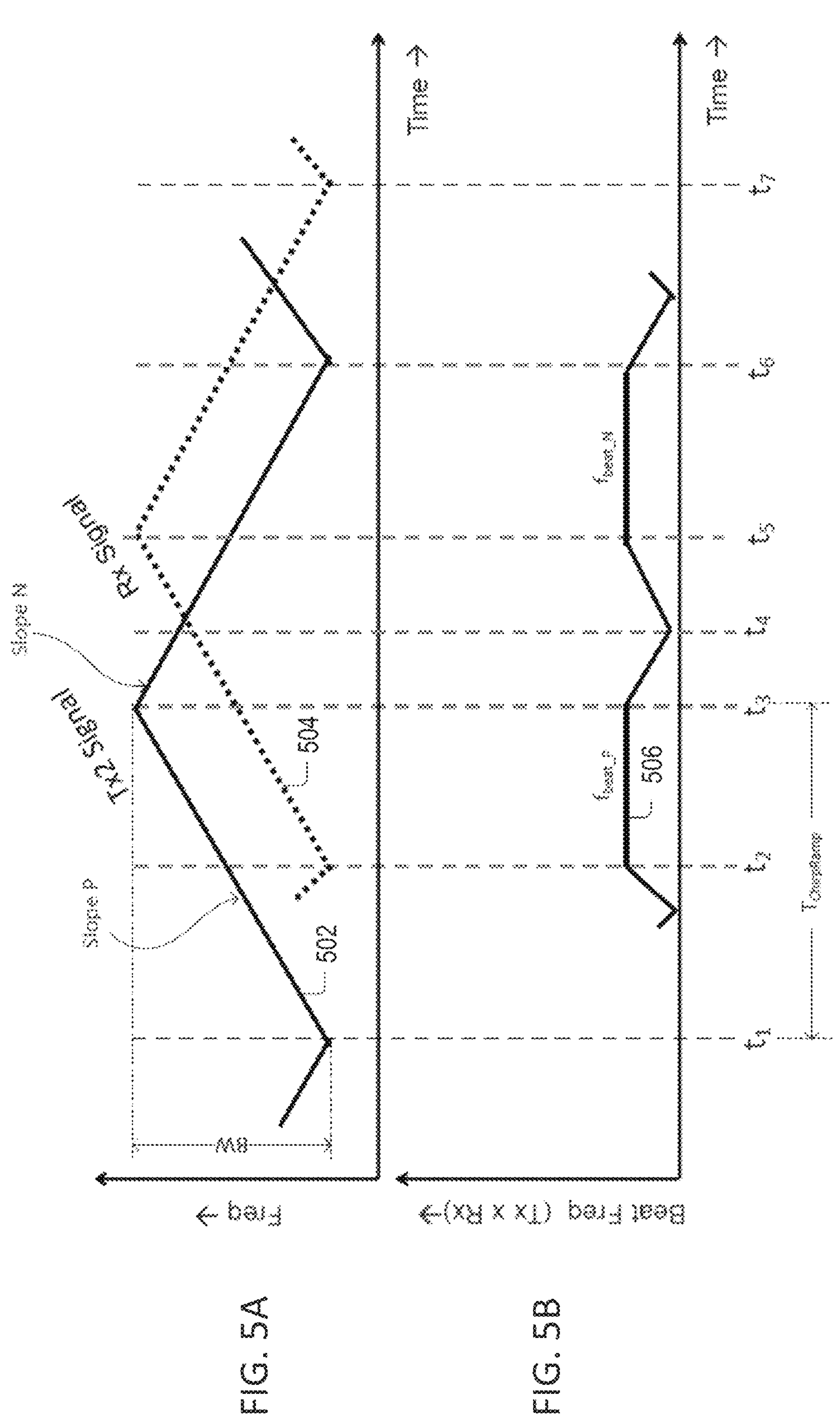
FIG. 5A is a plot of a frequency chirp as a function of time in a transmitted laser signal and reflected signal, in accordance with some embodiments.
FIG. 5B is a plot illustrating a beat frequency of a mixed signal, in accordance with some embodiments.

FIG. 5A is a plot of ideal (or desired) frequency chirp as a function of time in the transmitted laser signal Tx (e.g., signal Tx2), depicted in solid line 502, and reflected light signal Rx, depicted in dotted line 504. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 5B is a plot illustrating the corresponding ideal beat frequency $f_{beat}$ 506 of the mixed signal Tx2×Rx. Note that the beat frequency $f_{beat}$ 506 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 5A-5B, when the positive and negative ramp pair is used to measure range and velocity simultaneously, the following relationships are utilized:

$$\text{Range: } R = \frac{cT_{ChirpRamp}\frac{(f_{beat\_P}+f_{beat\_N})}{2}}{2BW},$$

and $$\text{Velocity: } V = \frac{\lambda\frac{(f_{beat\_P}-f_{beat\_N})}{2}}{2}$$

where $f_{beat\_P}$ and $f_{beat\_N}$ are beat frequencies generated during positive (P) and negative (N) slopes of the chirp 502 respectively and λ is the wavelength of the laser signal.

In one example, the scanner 408 of the lidar system 400 is used to scan the environment and generate a target point cloud from the acquired scan data. In some examples, the lidar system 400 can use processing methods that include performing one or more Fourier Transform calculations, such as a Fast Fourier Transform (FFT) or a Discrete Fourier Transform (DFT), to generate the target point cloud from the acquired scan data. Being that the system 400 is capable of measuring range, each point in the point cloud may have a three-dimensional location (e.g., x, y, and z) in addition to radial velocity. In some examples, the x-y location of each target point corresponds to a radial position of the target point relative to the scanner 408. Likewise, the z location of each target point corresponds to the distance between the target point and the scanner 408 (e.g., the range). In one example, each target point corresponds to one frequency chirp 502 in the laser signal. For example, the samples collected by the system 400 during the chirp 502 (e.g., t1 to t6) can be processed to generate one point in the point cloud.

Local Oscillator (LO) Signal Generation

As discussed above, coherent lidar systems can include a splitter (e.g., splitter 304, 404) configured to split the laser signal provided by the laser source into a transmit laser signal (e.g., Tx1) and a LO signal (e.g., Tx2). The LO signal may be mixed with a reflected light signal Rx to generate a beat frequency $f_{beat}$ that may be used to determine (e.g., calculate) the range and/or radial velocity of the target. However, in such configurations, the splitter functions by "tapping" the LO signal from the transmit laser signal. As such, the actual transmit signal emitted by the lidar system has an intensity level that is lower than the output of the laser source. In addition, losses inherent to the splitter (e.g., component losses, parasitic losses, etc.) can further reduce the intensity of the transmit laser signal. In some examples, losses attributed to the splitter can reduce the efficiency and performance of the lidar system. In certain examples, reflections from the Rx output port of the circulator 306, 406 (e.g., Port 3) are amplified by the LO signal, generating noise that is very strong (e.g., approximately 55 dB lower than the transmit laser signal Tx1). In some examples, the generated noise is more than 10 times stronger than a return signal produced from a target having a reflectance value of 10% located 1 meter from the lidar system. Such noise can reduce the near range visibility of the lidar system by blinding the return signal with a low beat frequency (e.g., similar to a return from stationary near range target).

Accordingly, improved systems and methods for generating local oscillator (LO) signals in coherent lidar systems are provided herein. In at least one embodiment, an LO signal is generated from a reflection of the transmit laser signal. In one example, the reflection occurs at a media-air interface of the lidar system. In some examples, at least one characteristic of the LO signal can be controlled by adjusting the configuration of the media-air interface.

Figure 6A:
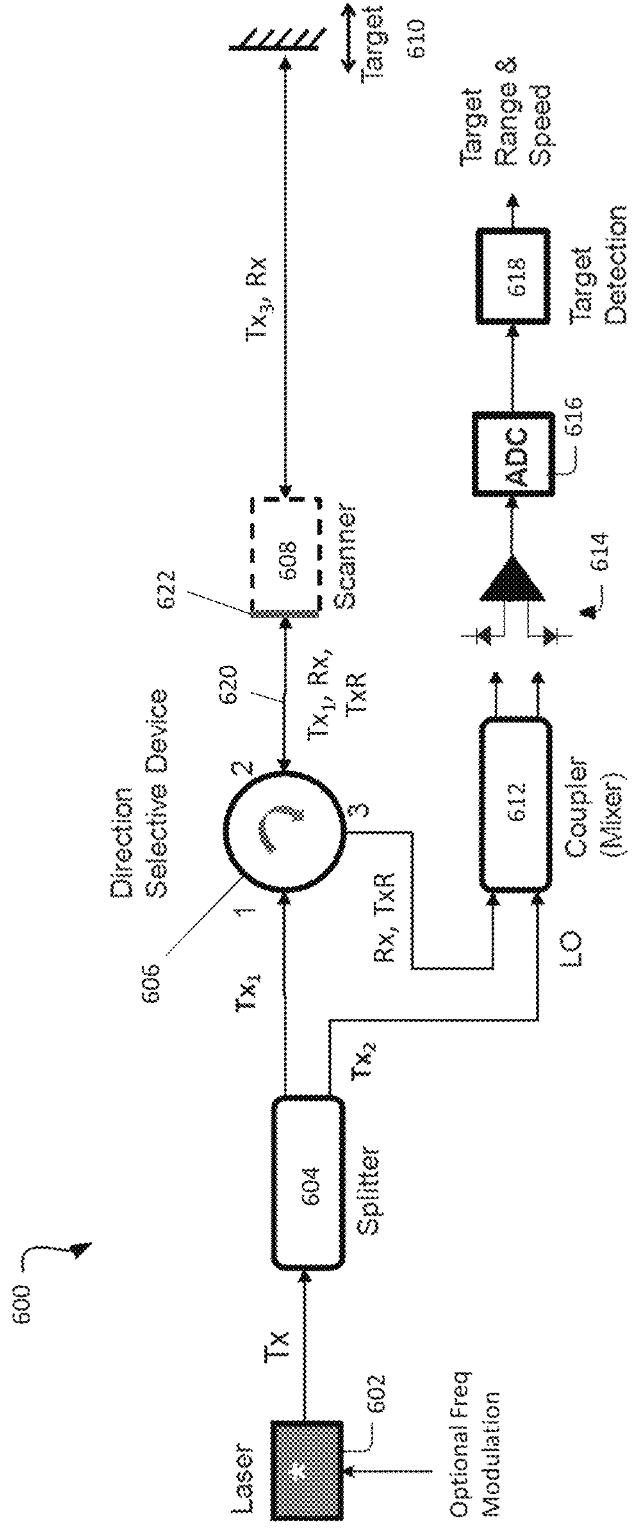
FIG. 6A is a functional block diagram of an example coherent lidar system, in accordance with some embodiments.

FIG. 6A illustrates an exemplary coherent lidar system 600, in accordance with some embodiments. In one example, the lidar system 600 is substantially similar to the lidar systems 300, 400 of FIGS. 3 and 4. The lidar system 600 includes a laser source 602, a splitter 604, a direction selective device 606, a scanner 608, a coupler (also referred to as a mixer) 612, a differential photodetector 614, an ADC 616, and a target detection module 618. In some examples, the lidar system 600 is configured to determine the range and/or radial velocity of a target 610.

In one example, the laser source 602 provides a laser signal (e.g., Tx) having a substantially constant laser frequency such that the lidar system 600 can be used to determine the radial velocity of a target (e.g., similar to the CW lidar system 300 of FIG. 3). In other examples, the laser signal Tx can be frequency modulated (e.g., chirped up/down). For example, the laser source 602 may be configured to provide a frequency modulated laser signal Tx such that the lidar system 600 can be used to determine the range and/or radial velocity of the target (e.g., similar to the FMCW lidar system 400 of FIG. 4). In one example, the optional frequency modulation is provided by changing the laser operating parameters (e.g., current/voltage) or using a modulator included in the laser source 602; however, in other examples, an external modulator can be placed between the laser source 602 and the splitter 604.

The splitter 604 is configured to split the laser signal Tx provided by the laser source 602 into a transmit laser signal Tx1 and an LO signal (e.g., Tx2). In one example, the splitter functions by "tapping" the LO signal from the transmit laser signal Tx. For example, the LO signal may correspond to a fraction of light (e.g., 0.01%-50%) tapped from the transmit signal Tx. As such, the actual transmit signal provided to the scanner 608 may have an intensity level that is lower than the output of the laser source 602. In some examples, losses inherent to the splitter 604 (e.g., component losses, parasitic losses, etc.) and other components in the signal path can further reduce the intensity of the transmit laser signal. For example, the total loss in the transmit signal path up to the scanner 608 can be represented by the following relationship:

$$Tx_L = SP_L + DS_L + TM_L$$

where, $SP_L$ is the component loss associated with the splitter 604, $DS_L$ is the component loss associated with the direction selective device 606, $TM_L$ is the loss associated with the transmission medium(s) between each of the components, and $Tx_L$ is the total component loss in the transmit signal path. In some examples, the losses associated with the transmission mediums include a first loss attributed to the transmission medium between the laser source 602 and the splitter 604, a second loss attributed to the transmission medium between the splitter 604 and the direction selective device 606, and a third loss attributed to the transmission medium between the direction selective device 606 and the scanner 608. The first, second, and third transmission mediums may each be a fiber medium, a silicon medium, or any other suitable optical transmission medium.

The transmission medium used between the direction selective device 606 and the scanner 608 may be configured as a bidirectional transmission medium. As shown in FIG. 6A, the transmit signal Tx1 propagates via transmission medium 620 from Port 2 of the direction selective device 606 to the scanner 608. Likewise, a reflected light signal (e.g., Rx) may propagate via transmission medium 620 from the scanner 608 to Port 2 of the direction selective device 606. In one example, the transmission medium 620 is a fiber medium; however, in other examples, the transmission medium 620 may be a different medium (e.g., silicon).

In some examples, a portion of the transmit signal Tx1 is reflected when the optical transmission medium transitions from media to air. For example, a portion of the transmit signal Tx1 is reflected at a media-air interface 622 of the lidar system 600. The remaining portion of the transmit signal Tx1 is directed towards an optical lens of the scanner 608 as transmit signal Tx3 and launched into free space. In one example, the reflection that occurs at the media-air interface 622 is a Fresnel reflection. In one embodiment, the media-air interface 622 is located at the end of the transmission medium 620 where the transmit signal is launched into air towards the optical lens of the scanner 608. As such, the reflection of the transmit signal occurs before the transmit signal reaches the optical lens of the scanner 608. In some examples, the reflected transmit signal ("TxR") propagates back through the transmission medium 620 to Port 2 of the direction selective device 606 with the reflected light signal Rx. Being that the reflected transmit signal TxR is an in-band signal (e.g., a signal having the same wavelength as the transmit signal Tx1), the reflected transmit signal TxR may be directed from Port 3 of the direction selective device 606 with the reflected light signal Rx. In one example, both the reflected light signal Rx and the reflected transmit signal TxR are directed from Port 3 of the direction selective device 606 to the mixer 612. The mixer 612 is configured to mix the reflected light signal Rx with the local oscillator signal LO to generate the mixed signal with the beat frequency $f_{beat}$ and the mixed signal is then converted to a current/voltage to produce a target detection signal. However, in some examples, the mixer 612 also mixes the reflected transmit signal TxR with the local oscillator signal LO, producing undesired tones in the target detection signal.

Figure 6B:
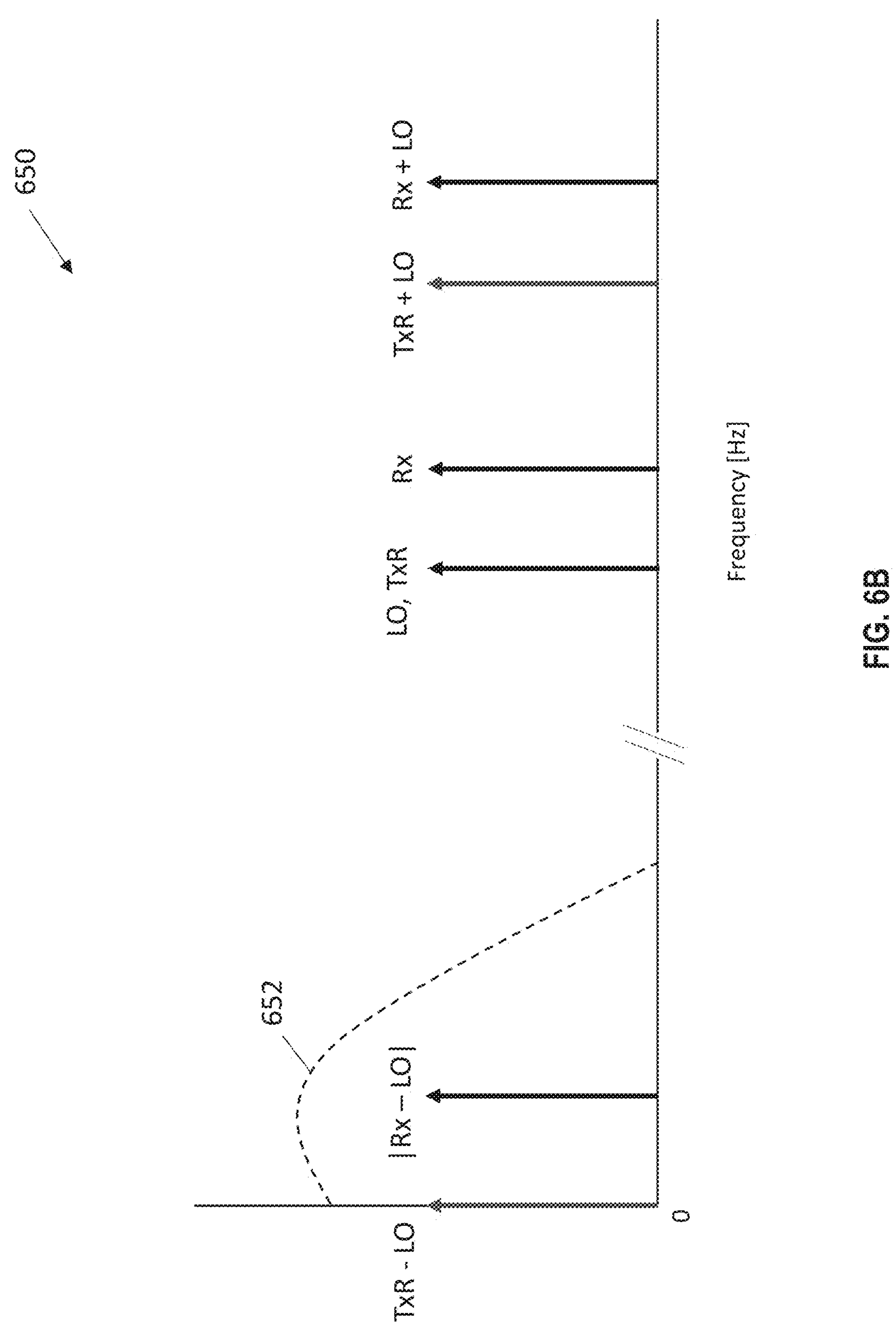
FIG. 6B is an illustration of a frequency spectrum representing, in accordance with some embodiments, frequency content of a target detection signal produced by the lidar system of FIG. 6A.

FIG. 6B illustrates an exemplary frequency spectrum 650 representing the frequency content of a target detection signal produced by the lidar system 600. In some examples, the target detection signal corresponds to the current produced by the differential photodetector 614 based on the mixed signal with beat frequency $f_{beat}$. In other examples, the target detection signal corresponds to the voltage provided by an amplifier (e.g., a transimpedance amplifier (TIA)) based on the current. As shown in FIG. 6B, the local oscillator signal LO and the reflected light signal Rx mix to produce an upconverted frequency tone at Rx+LO Hz and a down-converted frequency tone at |Rx−LO| Hz. A filter 652 (e.g., low-pass filter) may be used to filter out the LO, Rx, and Rx+LO tones. The remaining down-converted |Rx−LO| tone can be analyzed to determine (e.g., calculate) the range and/or radial velocity of the target 610. In some examples, the filter 652 corresponds to one or more physical or digital filters included in the target detection module 618 of FIG. 6A; however, in other examples, the filter 652 may be one or more physical or digital filters positioned prior to the ADC 616 of FIG. 6A. In certain examples, the filter 652 may be one or more physical or digital filters positioned between the ADC 616 and the target detection module 618.

With reference again to FIG. 6B, the local oscillator signal LO and the reflected transmit signal TxR also mix to produce an upconverted frequency tone at TxR+LO Hz and a down-converted frequency tone at |TxR–LO| Hz. In one example, the local oscillator signal LO and the reflected transmit signal TxR have similar frequencies. As such, the upconverted frequency tone at TxR+LO Hz may correspond to an undesired tone (or a portion of a tone) at approximately 2*LO Hz. Likewise, the down-converted frequency tone at |TxR–LO| Hz may correspond to an undesired tone (or a portion of a tone) at baseband (i.e., less than 10,000 Hz). In some examples, the frequency of the undesired baseband tone corresponds to the length of the signal path and/or the chirp rate of the laser source 602. The filter 652 may filter out the undesired TxR+LO (or approximately 2*LO) tone. However, the undesired baseband tone may be within the passband of the filter 652 and can interfere in determining the range and/or radial velocity of the target 610. For example, the undesired baseband tone (i.e., the down-converted |TxR–LO| tone) may appear as a false target or reading. In some examples, the undesired baseband tone may mix with other tones (e.g., the Rx tone, the Rx-LO tone, etc.) and produce a plurality of undesired tones within the passband of the filter 652. As such, the reflected transmit signal TxR may cause the resolution and/or accuracy of the lidar system 600 to be degraded.

In some examples, additional components (e.g., filters, attenuators, etc.) may be used to mitigate the effects of the reflected transmit signal TxR. However, such additional components can introduce additional losses into the transmit and/or receive signal paths. In addition, these additional components may increase the cost and/or size of the lidar system 600. Accordingly, rather than attempting to mitigate the reflected transmit signal TxR, it may be beneficial to utilize the reflection that occurs at the media-air interface 622 (see FIG. 6A) for functional purposes within the lidar system 600. For example, the reflection that occurs at the media-air interface 622 can be used to generate the local oscillator signal LO.

Figure 7A:
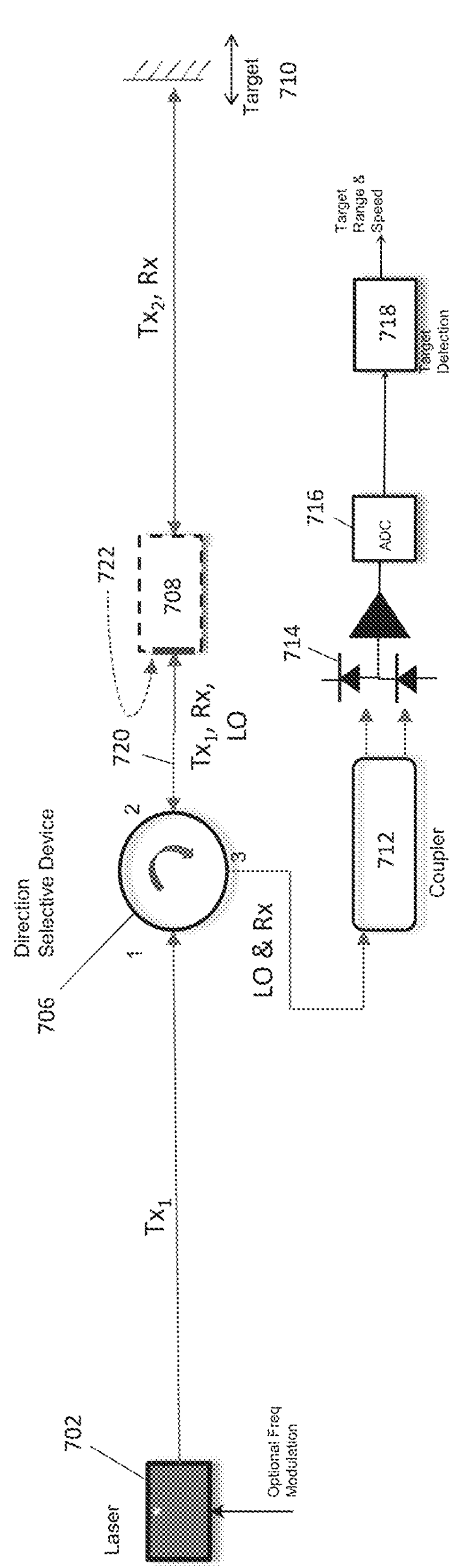
FIG. 7A is a functional block diagram of a coherent lidar system, in accordance with some embodiments.

FIG. 7A illustrates a coherent lidar system 700, in accordance with some embodiments. In one example, the lidar system 700 is substantially similar to the lidar system 600 of FIG. 6A, except the splitter (e.g., splitter 604) is removed from lidar system 700. The lidar system 700 includes a laser source 702, a direction selective device 706, a scanner 708, a coupler 712, a differential photodetector 714, an ADC 716, and a target detection module 718. In some examples, the lidar system 700 is configured to determine the range and/or radial velocity of a target 710.

In one example, the laser source 702 provides a laser signal (e.g., Tx1) having a substantially constant laser frequency such that the lidar system 700 can determine the radial velocity of a target (e.g., similar to the CW lidar system 300 of FIG. 3). In other examples, the laser signal Tx1 can be frequency modulated (e.g., chirped up/down). For example, the laser source 702 may be configured to provide a frequency modulated laser signal Tx1 such that the lidar system 700 can determine the range and/or radial velocity of the target (e.g., similar to the FMCW lidar system 400 of FIG. 4). In one example, the optional frequency modulation is provided by changing the laser operating parameters (e.g., current/voltage) or using a modulator included in the laser source 702; however, in other examples, an external modulator can be placed between the laser source 702 and the direction selective device 706.

Figure 7B:
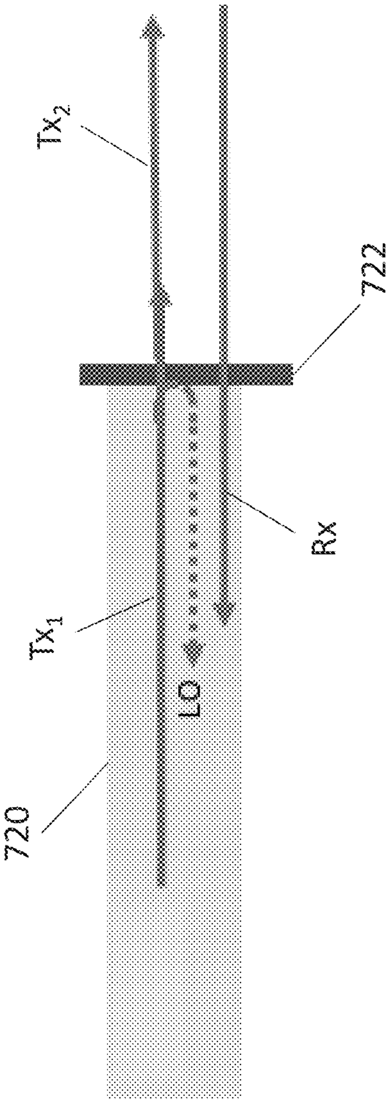
FIG. 7B is an illustration of a media-air interface of the lidar system of FIG. 7A, in accordance with some embodiments.

In one example, the laser source 702 provides the transmit laser signal Tx1 to the direction selective device 706, which provides (e.g., forwards) the transmit laser signal Tx1 to the scanner 708. In some examples, the direction selective device 706 is a circulator. In one example, the transmit signal Tx1 propagates via transmission medium 720 from Port 2 of the direction selective device 706 to the scanner 708. The lidar system 700 includes a media-air interface 722 located at the end of the transmission medium 720 where the transmit signal is launched into air towards the optical lens of the scanner 708. It should be appreciated that the media-air interface 722 is not a component or device, but rather the location at which the transmit signal transitions from the transmission medium 720 to air. As shown in FIG. 7B, a first portion of the transmit laser signal Tx1 is directed towards an optical element (e.g., a collimating lens, parabolic mirror, etc.) of the scanner 708 as transmit signal Tx2 and launched into free space. In some examples, the optical element of the scanner 708 may be optional. Conversely, a second portion of the transmit laser signal Tx1 is reflected, at the media-air interface 722, back towards the direction selective device 706 as the local oscillator signal LO. The scanner 708 uses the transmit laser signal Tx2 to transmit light emitted by the laser 702 and receives light reflected by the target 710 (e.g., "reflected light" or "reflections"). In some examples, the reflected light signal Rx is provided (e.g., passed back) to the direction selective device 706 via the transmission medium 720 with the local oscillator signal LO.

Referring again to FIG. 7A, the local oscillator signal LO and the reflected light signal Rx are provided by the direction selective device 706 to the coupler 712. The coupler 712 may be configured to couple (or combine) the reflected light signal Rx with the local oscillator signal LO to generate a beat frequency $f_{beat}$ when detected by the differential photodetector 714. The beat frequency $f_{beat}$ from the differential photodetector 714 output is used to produce a current based on the received light. The current may be converted to voltage by an amplifier (e.g., a transimpedance amplifier (TIA)) and the voltage may be provided (e.g., fed) to the ADC 716, which may be configured to convert the analog voltage signal to digital samples for a target detection module 718. The target detection module 718 may be configured to determine (e.g., calculate) the range and/or radial velocity of the target 710 based on the digital sampled signal with beat frequency $f_{beat}$.

In some examples, the target detection module 718 is configured to determine the reflectivity of the target 710 based on the reflected light signal Rx and the LO signal (i.e., the reflected portion of the transmit laser signal Tx1). For example, the following relationship may be used to determine target reflectivity:

$$\text{Target reflectivity} = \frac{Rx \times \pi R^2}{Tx1 \times LO \times A_{Rx} \times \cos\varphi}$$

where, $A_{Rx}$ is the receiving aperture (e.g., an optical aperture of 1000) and φ is the target incident angle (e.g., the angle between the beam direction and the target surface normal).

Characteristics of the LO signal (i.e., the reflected portion of the transmit laser signal Tx1) can be controlled based on the configuration of the media-air interface 722. In some examples, the configuration of the media-air interface 722 corresponds to the configuration of the transmission medium 720.

Figure 8A:
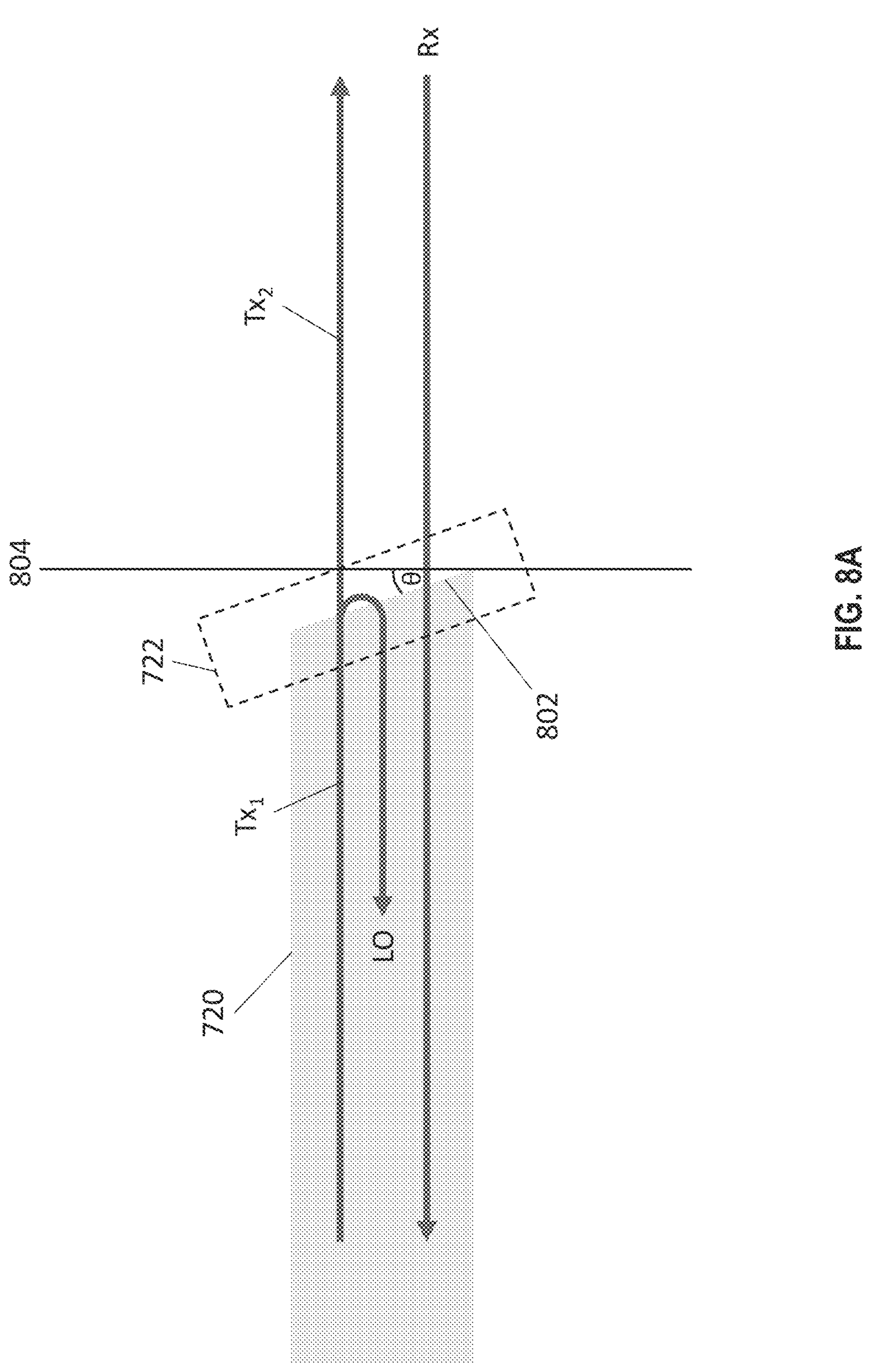
FIG. 8A is another illustration of a media-air interface of the lidar system of FIG. 7A, in accordance with some embodiments.

As shown in FIG. 8A, the transmission medium 720 may be configured with an angled endface 802 to control the intensity of the LO signal that is reflected back to the direction selective device 706. In one example, the angled endface 802 corresponds to an angled physical contact (APC) connector attached to the transmission medium 720; however, in other examples, the transmission medium 720 may be configured (e.g., cut) to provide the angled endface 802. The angle θ of the endface 802 can be adjusted to control the intensity of the LO signal. In some examples, the angle θ of the endface 802 is adjusted relative to a reference line 804 that is perpendicular to the transmit laser signal Tx1 (or a longitudinal axis of the transmission medium 720). By adjusting the angle θ of the endface 802, the amount of light reflected from transmit laser signal Tx1 at the media-air interface 722 that propagates back through the transmission medium 720 can be increased or decreased. For example, the transmission medium 720 can include a core made of a high-refractive index material and cladding made of a low-refractive index material that surrounds the core. Increasing the angle θ of the endface 802 may increase the amount of light reflected from the transmit laser signal Tx1 that is directed into the cladding of the transmission medium 720, thereby decreasing the amount of reflected light that propagates in the core (i.e., the intensity of the LO signal). Likewise, decreasing the angle θ of the endface 802 may reduce the amount of light reflected from the transmit laser signal Tx1 that is directed into the cladding of the transmission medium 720, thereby increasing the amount of reflected light that propagates in the core (i.e., the intensity of the LO signal). As such, the angle θ can be adjusted to achieve a desired intensity for the LO signal (e.g., 0.01-50% of the transmit laser signal Tx1).

Figure 8B:
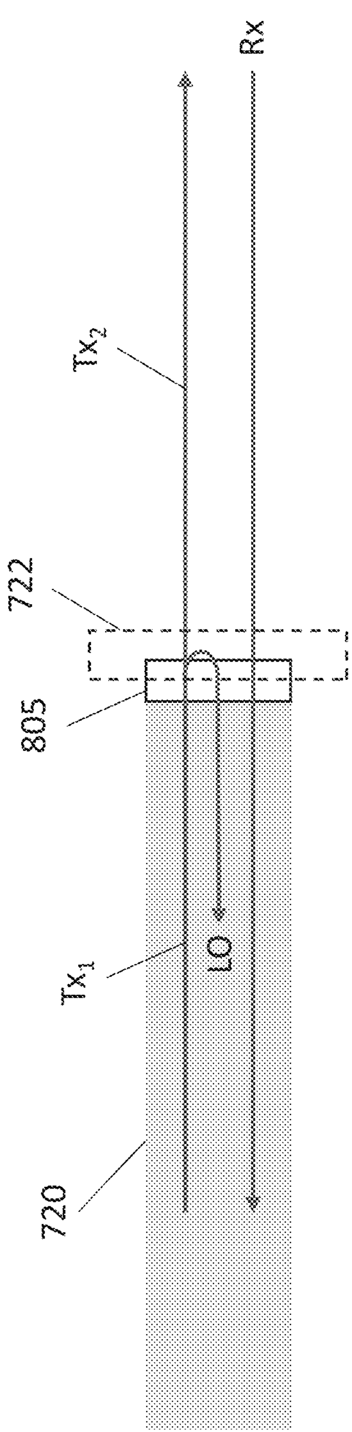
FIG. 8B is another illustration of a media-air interface of the lidar system of FIG. 7A, in accordance with some embodiments.

In another example, a material or substance may be applied to the transmission medium 720 to control characteristics of the LO signal. For example, a coating may be applied to the transmission medium 720. In one example, the coating is a fiber tip coating of thin films made up of a single or multiple layers of metallic and/or dielectric materials. As shown in FIG. 8B, a coating 805 can be applied to the transmission medium 720 to control the intensity of the LO signal that is reflected back to the direction selective device 706. In one example, the coating 805 is applied directly to the transmission medium 720; however, in other examples, the coating 805 may be applied to a connector attached to the transmission medium 720 (e.g., an APC connector, an ultra physical contact (UPC) connector, etc.). In some examples, the light reflected from the transmit laser signal Tx1 at the media-air interface 722 is dampened (or attenuated) by a particular amount based on the material (or substance) of the coating 805. As such, the material of the coating 805 may be selected to achieve a desired intensity for the LO signal. In another example, the light reflected from the transmit laser signal Tx1 at the media-air interface 722 is dampened (or attenuated) by a particular amount based on the thickness of the coating 805. In such examples, the thickness of the coating 805 may be selected to achieve a desired intensity for the LO signal. In some examples, the coating 805 is an anti-reflection (AR) coating. In one example, the coating 805 corresponds to a partially reflective mirror (e.g., made from BK7, fused silica, or other suitable materials). In other examples, the coating 805 may provide a dispersion (or diffraction) of light to direct a desired amount of the light reflected from the transmit laser signal Tx1 at the media-air interface 722 into the cladding of the transmission medium 720.

Figure 8C:
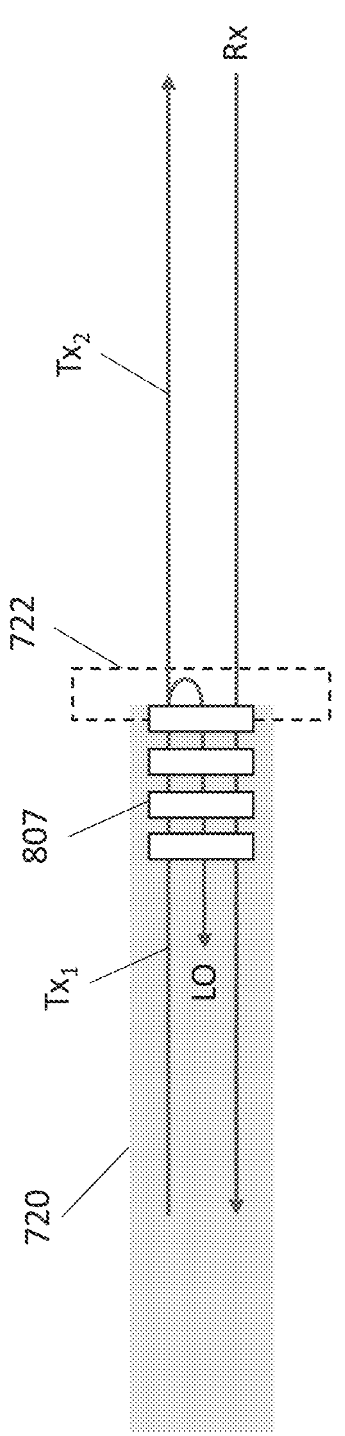
FIG. 8C is another illustration of a media-air interface of the lidar system of FIG. 7A, in accordance with some embodiments.

In some examples, a component or device may be attached to the transmission medium 720 to control characteristics of the LO signal. As shown in FIG. 8C, a grating 806 can be attached to (or disposed adjacent to) the transmission medium 720 to control the intensity of the LO signal that is reflected back to the direction selective device 706. In one example, the grating 806 is a diffraction grating configured to diffract light in different directions (e.g., at different angles). The diffraction grating may be configured as a transmission grating, a ruled grating, a holographic grating, a reflection grating, or any other suitable optical grating. In some examples, the grating 806 is attached to (or disposed adjacent to) the transmission medium 720 directly; however, in other examples, the grating 806 may be attached to (or disposed adjacent to) a connector attached to the transmission medium 720 (e.g., an APC connector, a UPC connector, etc.). The grating 806 can provide a dispersion (or diffraction) of light that directs a desired amount of the light reflected from the transmit laser signal Tx1 at the media-air interface 722 into the cladding of the transmission medium 720. As such, the configuration of the grating 806 may be selected or adjusted to achieve a desired intensity for the LO signal.

In some examples, a component or device may be integrated into the transmission medium 720 to control characteristics of the LO signal. As shown in FIG. 8D, a grating 807 can be included within the transmission medium 720 to control the intensity of the LO signal that is reflected back to the direction selective device 706. In one example, the grating 807 is a fiber Bragg grating configured to reflect (at least partially) specific wavelengths of light and to transmit all others. For example, the grating 807 may be configured to reflect light at the desired LO signal frequency (e.g., the frequency of the transmit laser signal Tx1). In some examples, the grating 807 is included within the transmission medium 720 directly; however, in other examples, the grating 807 may be included within a connector attached to the transmission medium 720 (e.g., an APC connector, a UPC connector, etc.). The grating 807 can provide a reflection that directs a desired amount of the light reflected from the transmit laser signal Tx1 back towards the direction selective device 706 as the LO signal. As such, the configuration of the grating 807 may be selected or adjusted to achieve a desired intensity for the LO signal.

As described above, different features and configurations of the transmission medium 720 may be adjusted to control characteristics of the LO signal. It should be appreciated that these features and configurations of the transmission medium 720 are not intended to contribute to the reflection of the transmit signal, but rather to control characteristics of the resulting reflected signal that propagates back towards the direction selective device 706. In some examples, a combination of such features and/or configurations of the transmission medium 720 can be used to control characteristics of the LO signal. For example, the transmission medium 720 may be configured with an angled endface (e.g., endface 802) and a coating (e.g., coating 805) to achieve a desired intensity for the LO signal. Likewise, the transmission medium 720 may be configured with a coating (e.g., coating 805) and a grating (e.g., grating 806 or 807) to achieve a desired intensity for the LO signal.

Figure 9:
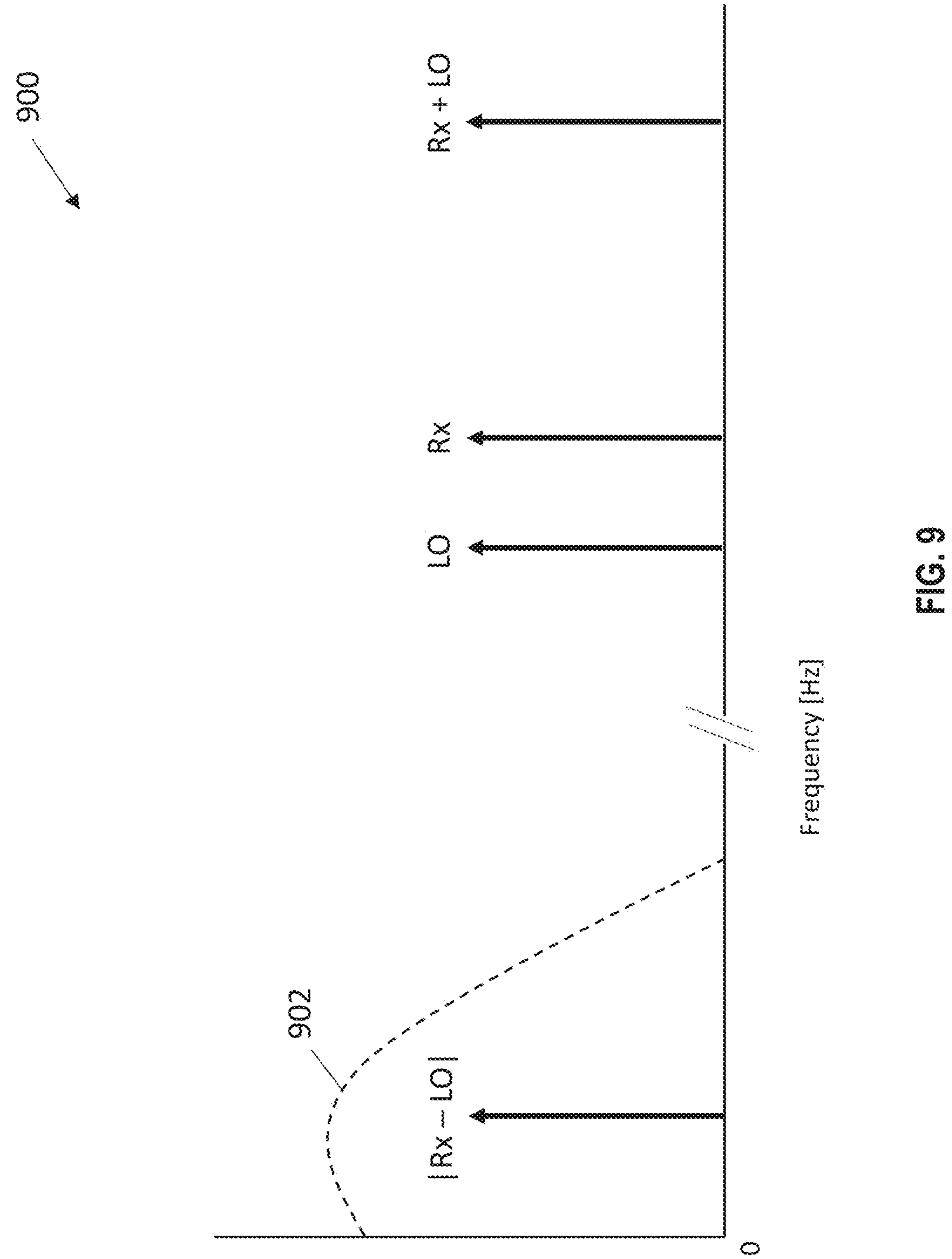
FIG. 9 is an illustration of a frequency spectrum representing frequency content of a target detection signal produced by the lidar system of FIG. 7A, in accordance with some embodiments.

In some examples, by utilizing the reflection from the transmit laser signal Tx1 at the media-air interface 722 as the LO signal, the effects of undesired tones associated with the reflection can be minimized (or eliminated). For example, FIG. 9 illustrates a frequency spectrum 900 representing frequency content of a target detection signal produced by the lidar system 700, in accordance with some embodiments. In some examples, the target detection signal corresponds to the current produced by the differential photodetector 714 based on the coupled signal with beat frequency $f_{beat}$. In other examples, the target detection signal corresponds to the voltage provided by an amplifier (e.g., a transimpedance amplifier (TIA)) based on the current. As shown in FIG. 9, the local oscillator signal LO (e.g., the reflected portion of the transmit laser signal Tx1) and the reflected light signal Rx mix to produce an upconverted frequency tone at Rx+LO Hz and a down-converted frequency tone at |Rx−LO| Hz. A filter 902 (e.g., a low-pass filter) may be used to filter out the LO, Rx, and Rx+LO tones. In some examples, the filter 902 corresponds to one or more physical or digital filters included in the target detection module 718; however, in other examples, the filter 902 may be one or more physical or digital filters positioned prior to the ADC 716. In certain examples, the filter 902 may be one or more physical or digital filters positioned between the ADC 716 and the target detection module 718.

The remaining down-converted |Rx−LO| tone can be analyzed to determine (e.g., calculate) the range and/or radial velocity of the target 710. Being that the reflected portion of the transmit laser signal Tx1 is used as the LO signal, undesired tones associated with the reflection at the media-air interface 722 may be minimized (or eliminated) from the passband of the filter 902. As such, the resolution and/or accuracy of the lidar system 700 may be improved (e.g., relative to the lidar system 600 of FIG. 6A).

In some examples, by generating the LO signal without the use of a dedicated component (e.g., the splitter 604 depicted in FIG. 6A), the amount of loss in the transmit signal path may be reduced. For example, with reference again to FIG. 7A, the total component loss in the transmit signal path up to the scanner 708 can be represented by the following relationship:

$$Tx_L = DS_L + TM_L$$

where, $DS_L$ is the component loss associated with the direction selective device 706, $TM_L$ is the loss associated with the transmission medium(s) between each of the components, and $Tx_L$ is the total component loss in the transmit signal path. In some examples, the losses associated with the transmission mediums include a first loss attributed to the transmission medium between the laser source 702 and the direction selective device 706 and a second loss attributed to the transmission medium between the direction selective device 706 and the scanner 708. In some examples, by reducing the component loss in the transmit signal path, the efficiency of the lidar system 700 may be improved (e.g., relative to the lidar system 600 of FIG. 6A). In certain examples, the lidar system 700 may operate with reduced power consumption relative to other lidar systems (e.g., the lidar system 600 of FIG. 6A).

In some examples, with reference to FIG. 7A, a calibration process is used to adjust the configuration of the media-air interface 722. In one example, the calibration process includes measuring the intensity of the LO signal (e.g., at the coupler 712) and adjusting the configuration of the transmission medium 720 until a desired intensity level for the LO signal is achieved. In another example, the energy detected in the transmit laser signal Tx2 may be used to determine the intensity of the LO signal that is reflected from the transmit laser signal Tx1 at the media-air interface 722. For example, the energy (or intensity) of the LO signal may be represented by the following relationship:

$$LO = Tx_1 - Tx_L - Tx_2$$

where, $Tx_L$ is the total component loss in the transmit signal path described above. Being that the intensity of the transmit signal Tx1 is set by the laser source 702 and $Tx_L$ is a fixed loss (or a substantially fixed loss), changes in the intensity of the transmit laser signal Tx2 may indicate corresponding changes in the intensity of the LO signal. As such, the configuration of the transmission medium 720 may be iteratively adjusted until the energy detected in the transmit laser signal Tx2 meets or falls below a threshold energy level indicating that the intensity of the LO signal is at an acceptable (or desired) level. In one example, the energy of the transmit laser signal Tx2 can be measured at the center of an optical lens (e.g., the optical lens of the scanner 708) for comparison to the threshold energy level. In certain examples, the threshold energy level may include upper and lower bounds and the configuration of the transmission medium 720 may be adjusted until the energy detected in the transmit laser signal Tx2 is within the upper and lower bounds. In some examples, the calibration process may include adjusting the intensity level of the transmit signal Tx1 (e.g., via the laser source 702).

While LO signal generation techniques for lidar systems including a single laser source (e.g., laser source 702) are described above, it should be appreciated that similar techniques may be used for lidar systems including multiple laser sources. For example, coherent lidar systems can include two lasers configured to provide separate frequency chirps in parallel to determine the range and/or speed (or velocity) of a target. In certain examples, the lasers may be configured to operate at different wavelengths with different rates of frequency movement. In such examples, the Tx signal from each laser source may be reflected at a common media-air interface (e.g., media-air interface 722) to produce two LO signals at different frequencies (e.g., corresponding to the frequencies of the laser sources). In some examples, the LO signals are directed to different Rx paths for processing the reflected light signal associated with each laser source frequency. Alternatively, a single reflected LO signal may be directed to both Rx paths. In such examples, the target detection module (e.g., target detection module 718) may provide a frequency compensation offset for one of the Rx paths. For example, if the reflected LO signal corresponds to the first laser source (e.g., the frequency of the first laser source), calculations performed by the target detection module for the second laser source may be compensated to account for the frequency offset between the first laser source and the second laser source, or vice versa.

Figure 10:
FIG. 10 is a flow diagram of a method for assembling a lidar system, in accordance with some embodiments.
Figure 10:
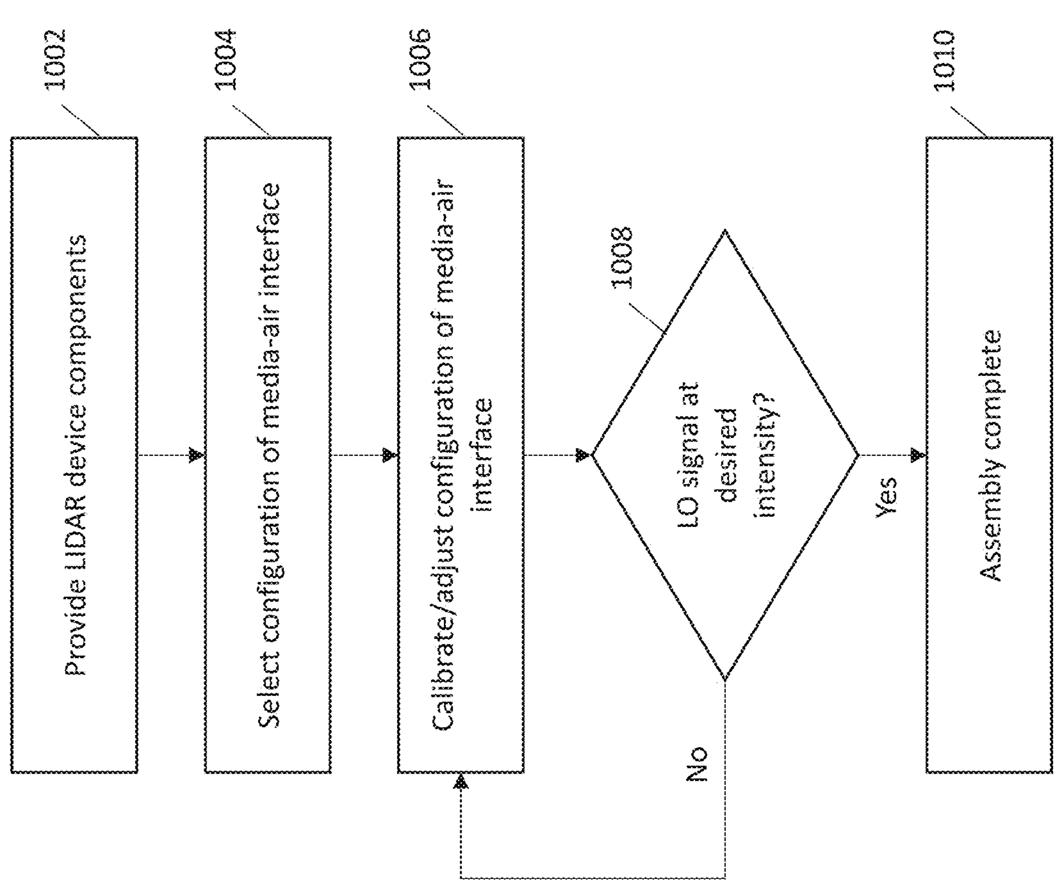

FIG. 10 illustrates a method 1000 for manufacturing a lidar device, in accordance with some embodiments. In one example, the lidar device corresponds to the lidar system 700 of FIG. 7A.

At step 1002, the lidar device components are provided for assembly. In one example, the components include the laser source 702, the direction selective device 706, the scanner 708, and the coupler 712. A first transmission medium may be used to couple the laser source 702 to a first port the direction selective device 706 (e.g., Port 1), a second transmission medium may be used to couple a second port of the direction selective device 706 (e.g., Port 2) to the scanner 708, and a third transmission medium may be used to couple a third port of the direction selective device 706 (e.g., Port 3) to the coupler 712. The first, second, and third transmission mediums may each be a fiber medium, a silicon medium, or any other suitable optical transmission medium. In some examples, the second transmission medium corresponds to the transmission medium 720 of FIG. 7.

At step 1004, a configuration is selected for a media-air interface of the lidar device to control characteristics of the LO signal. In one example, the media-air interface corresponds to the media-air interface 722 between the transmission medium 720 and the scanner 708. As described above, the configuration of the media-air interface 722 may correspond to the configuration of the transmission medium 720. For example, the transmission medium 722 may be configured with an angled endface (e.g., endface 802 of FIG. 8A) to control the intensity of the LO signal that is reflected back to the direction selective device 706. In another example, a material or substance (e.g., coating 805 of FIG. 8B) may be applied to the transmission medium 720 to control the intensity of the LO signal that is reflected back to the direction selective device 706. In other examples, a component or device (e.g., grating 807 of FIG. 8C) may be attached to the transmission medium 720 to control the intensity of the LO signal that is reflected back to the direction selective device 706. In some examples, the transmission medium 722 may be configured with a combination of angled features, materials, substances, devices, and/or components to control characteristics of the LO signal.

At step 1006, the configuration of the media-air interface 722 (or the transmission medium 720) is calibrated to achieve a desired intensity for the LO signal. In one example, the calibration process includes measuring the intensity of the LO signal (e.g., at the coupler 712) and adjusting the configuration of the transmission medium 720 until the desired intensity level for the LO signal is achieved. In other examples, the calibration process includes measuring the intensity of the transmit signal Tx2 (e.g., at the lens of the scanner 708) and adjusting the configuration of the transmission medium 720 until the intensity of the transmit signal Tx2 is below (or within) a threshold energy level indicating that the intensity of the LO signal is at the desired level. In some examples, adjusting the configuration of the transmission medium 720 includes adjusting the angle θ of the angled endface 802 (see FIG. 8A), adjusting the material or thickness of the coating 805 (see FIG. 8B), and/or adjusting the configuration of the grating 806 (see FIG. 8C) to achieve the desired intensity level for the LO signal.

At step 1008, the intensity level of the LO signal is measured, observed, and/or estimated. In response to a determination that the LO signal has the desired intensity level, the method of assembly is completed (step 1010). Otherwise, the method of assembly returns to step 1006 where the calibration of the media-air interface 722 (or the transmission medium 720) continues.

In some examples, the coupler 712 can be connected (e.g., coupled) to the differential photodetector 714, the ADC 716, and/or the target detection module 718 prior to assembly completion. For example, at least one output of the coupler 712 may be coupled to at least one input of the differential photodetector 714, at least output of the differential photodetector 714 may be coupled to at least one input of the ADC 716, and at least one output of the ADC 716 may be coupled to at least one input of the target detection module 718. In certain examples, at least one amplifier (e.g., a transimpedance amplifier (TIA)) can be coupled between the differential photodetector 714 and the ADC 716.

As described above, improved systems and methods for local oscillator (LO) signal generation in coherent lidar systems are provided herein. In at least one embodiment, an LO signal is generated from a reflection of the transmit laser signal. In one example, the reflection occurs at a media-air interface of the lidar system. In some examples, at least one characteristic of the LO signal can be controlled by adjusting the configuration of the media-air interface. By generating the LO signal without the use of a dedicated component (e.g., a splitter), signal loss in the transmit path can be reduced. In addition, the effects of undesired tones associated with the reflection of the transmit laser signal at the media-air interface can be minimized (or eliminated), improving the resolution and/or accuracy of the lidar system. In some examples, by generating the LO signal without the use of a dedicated component, the cost of the lidar system is reduced.

Additional Embodiments, Computing Devices, and Information Handling Systems

Figure 11:
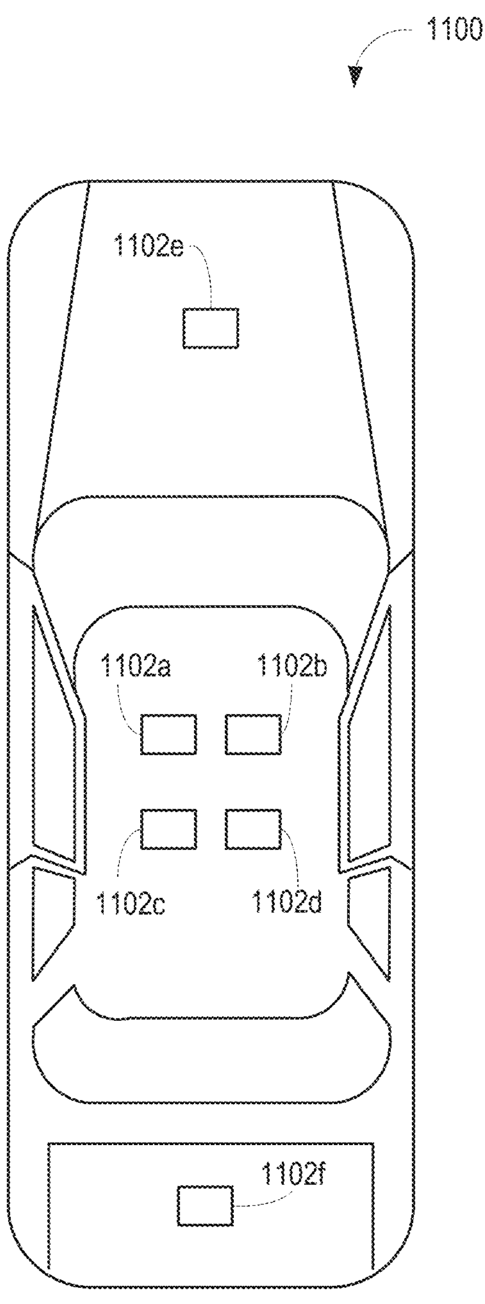
FIG. 11 is a diagram of a vehicle including a plurality of sensors, in accordance with some embodiments.

In some embodiments, lidar systems and techniques described herein may be used to provide mapping and/or autonomous navigation for a vehicle. FIG. 11 illustrates a vehicle 1100 having a plurality of sensors 1102. As shown, a first sensor 1102*a*, a second sensor 1102*b*, a third sensor 1102*c*, and a fourth sensor 1102*d* may be positioned in a first location on (or inside) the vehicle 1100 (e.g., the roof). Likewise, a fifth sensor 1102*e* may be positioned in a second location on (or inside) the vehicle 1100 (e.g., the front of the vehicle 1100) and a sixth sensor 1102*f* may be positioned in a third location on (or inside) the vehicle 1100 (e.g., the back of the vehicle 1100). In other examples, a different number or configuration of sensors may be used.

In some examples, at least one sensor of the plurality of sensors 1102 is configured to provide (or enable) 3D mapping of the vehicle's surroundings. In certain examples, at least one sensor of the plurality of sensors 1102 is used to provide autonomous navigation for the vehicle 1100 within an environment. In one example, each sensor 1102 includes at least one lidar system, device, or chip. The lidar system(s) included in each sensor 1102 may include any of the lidar systems disclosed herein. In some examples, at least one sensor of the plurality of sensors 1102 may be a different type of sensor (e.g., camera, radar, etc.). In one example, the vehicle 1100 is a car; however, in other examples, the vehicle 1100 may be a truck, boat, plane, drone, vacuum cleaner (e.g., robot vacuum cleaner), robot, train, tractor, ATV, or any other type of vehicle or moveable object.

In some embodiments, lidar systems and techniques described herein may be implemented using Silicon photonics (SiP) technologies. SiP is a material platform from which photonic integrated circuits (PICs) can be produced. SiP is compatible with CMOS (electronic) fabrication techniques, which allows PICs to be manufactured using established foundry infrastructure. In PICs, light propagates through a patterned silicon optical medium that lies on top of an insulating material layer (e.g., silicon on insulator (SOI)). In some cases, direct bandgap materials (e.g., indium phosphide (InP)) are used to create light (e.g., laser) sources that are integrated in an SiP chip (or wafer) to drive optical or photonic components within a photonic circuit. SiP technologies are increasingly used in optical datacom, sensing, biomedical, automotive, astronomy, aerospace, augmented reality (AR) applications, virtual reality (VR) applications, artificial intelligence (AI) applications, navigation, image identification, drones, robotics, etc.

Figure 12:
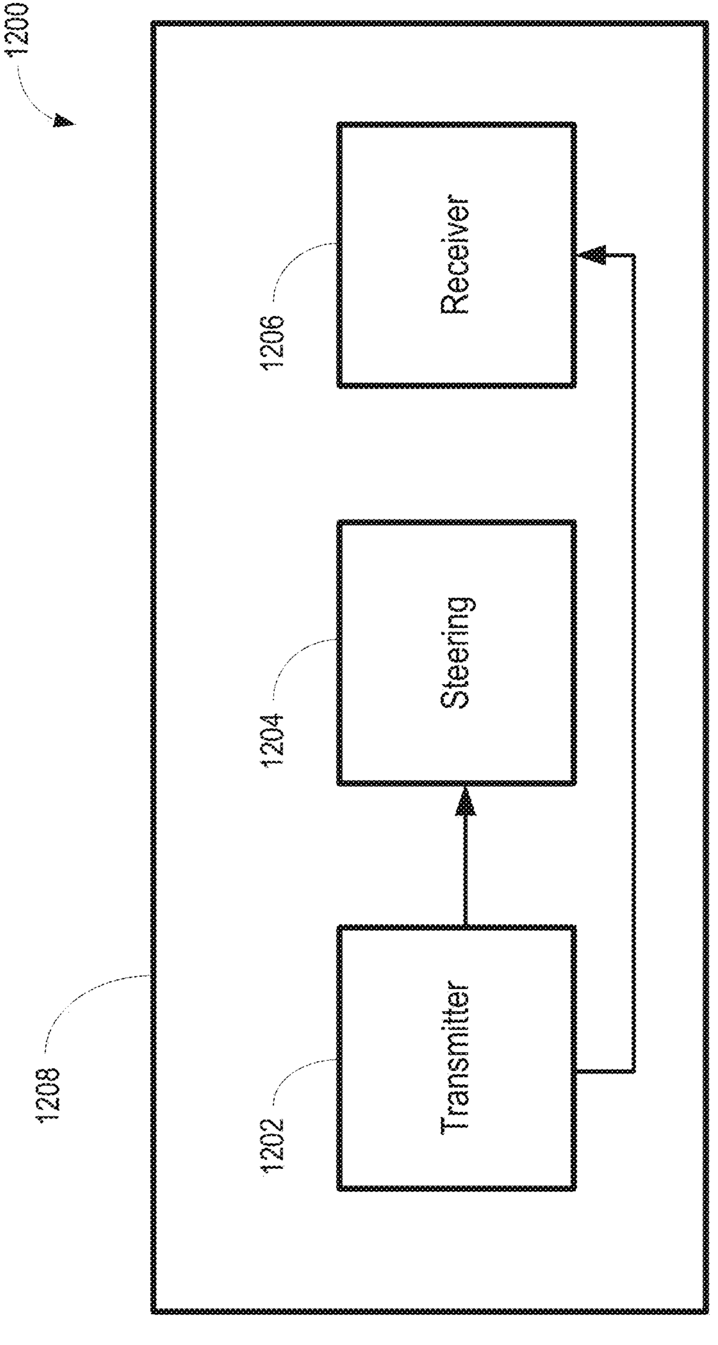
FIG. 12 is a block diagram of a silicon photonic integrated circuit (PIC) in accordance with some embodiments.

FIG. 12 is a block diagram of a silicon photonic integrated circuit (PIC) 1200 in accordance with aspects described herein. In one example, the lidar systems described herein can be implemented as the PIC 1200. The PIC 1200 includes a transmitter module 1202, a steering module 1204, and a receiver module 1206. As shown, the transmitter module 1202, the steering module 1204, and the receiver module 1206 are integrated on a silicon substrate 1208. In other examples, the transmitter module 1202, the steering module 1204, or the receiver module 1206 may be included on a separate substrate. In some embodiments, the steering module 1204 is used by the PIC 1200 in connection with transmission (e.g., emission) and reception (e.g., collection) of optical signals. In some examples, the silicon substrate 1208 is an SOI substrate with a silicon layer (e.g., between 200 nm and 10 micron thick) disposed over an oxide layer (e.g., approximately 2 micron thick). In certain examples, the silicon substrate 1208 can include multiple silicon and/or oxide layers.

In one example, the transmitter module 1202 includes at least one laser source. In some examples, the laser source(s) are implemented using a direct bandgap material (e.g., InP) and integrated on the silicon substrate 1208 via hybrid integration. The transmitter module 1202 may also include at least one splitter, a combiner, and/or a direction selective device that are implemented on the silicon substrate 1208 via monolithic or hybrid integration. In some examples, the laser source(s) are external to the PIC 1200 and the laser signal(s) can be provided to the transmission module 1202.

In some embodiments, lidar systems and techniques described herein may be implemented using micro-electromechanical system (MEMS) devices. A MEMS device is a miniature device that has both mechanical and electronic components. The physical dimension of a MEMS device can range from several millimeters to less than one micrometer. Lidar systems may include one or more scanning mirrors implemented as a MEMS mirror (or an array of MEMS mirrors). Each MEMS mirror may be a single-axis MEMS mirror or dual-axis MEMS mirror. The MEMS mirror(s) may be electromagnetic mirrors. A control signal is provided to adjust the position of the mirror to direct light in at least one scan direction (e.g., horizontal and/or vertical). The MEMS mirror(s) can be positioned to steer light transmitted by the lidar system and/or to steer light received by the lidar system. MEMS mirrors are compact and may allow for smaller form-factor lidar systems, faster control speeds, and more precise light steering compared to other mechanical-scanning lidar methods. MEMS mirrors may be used in solid-state (e.g., stationary) lidar systems and rotating lidar systems.

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), network storage device, or any other suitable device and may vary in size, shape, performance, functionality, and price.

Figure 13:
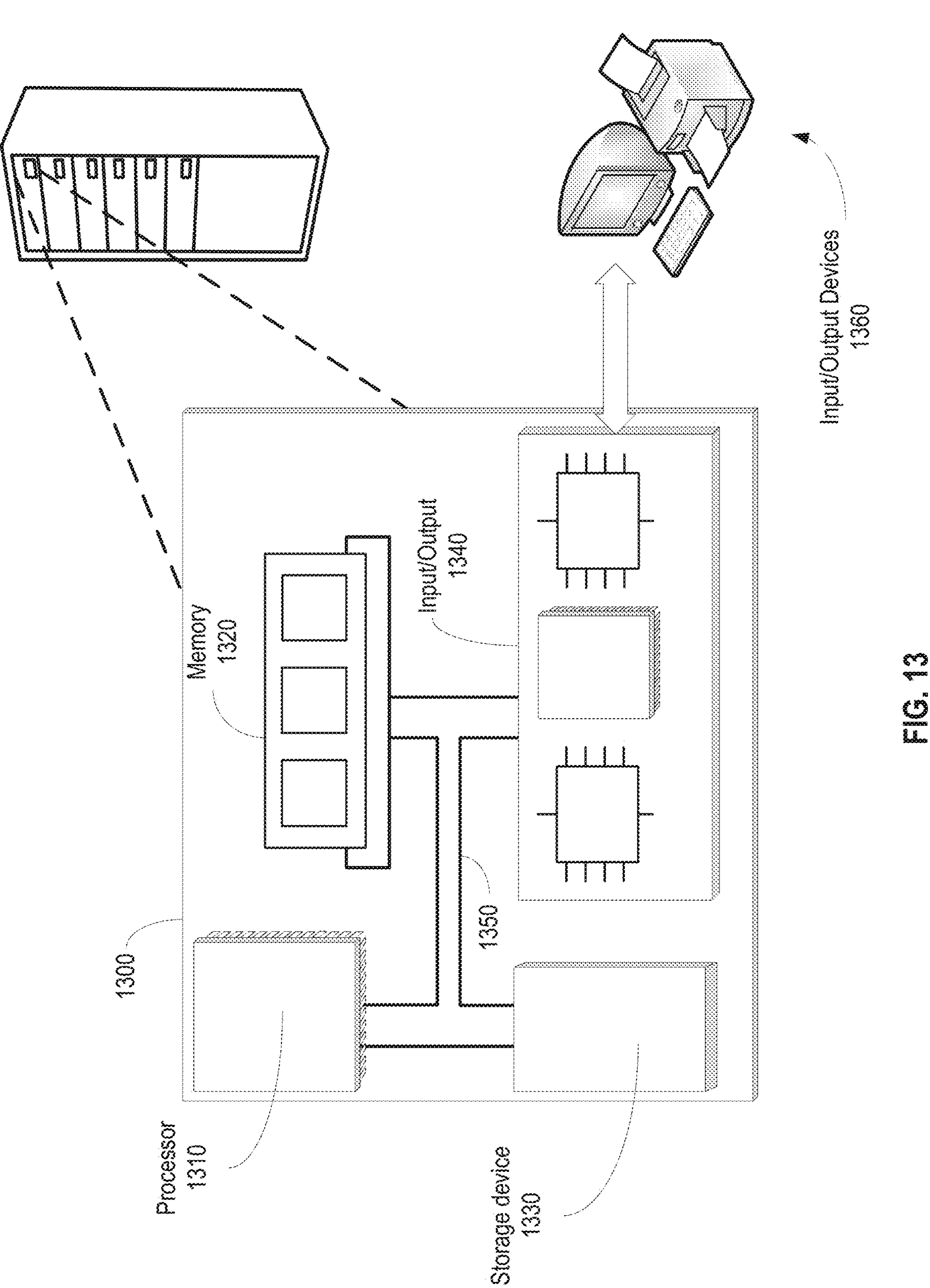
FIG. 13 is a block diagram of an example computer system, in accordance with some embodiments.

FIG. 13 is a block diagram of an example computer system 1300 that may be used in implementing the technology described in this document. General-purpose computers, network appliances, mobile devices, or other electronic systems may also include at least portions of the system 1300. The system 1300 includes a processor 1310, a memory 1320, a storage device 1330, and an input/output device 1340. Each of the components 1310, 1320, 1330, and 1340 may be interconnected, for example, using a system bus 1350. The processor 1310 is capable of processing instructions for execution within the system 1300. In some implementations, the processor 1310 is a single-threaded processor. In some implementations, the processor 1310 is a multi-threaded processor. In some implementations, the processor 1310 is a programmable (or reprogrammable) general purpose microprocessor or microcontroller. The processor 1310 is capable of processing instructions stored in the memory 1320 or on the storage device 1330.

The memory 1320 stores information within the system 1300. In some implementations, the memory 1320 is a non-transitory computer-readable medium. In some implementations, the memory 1320 is a volatile memory unit. In some implementations, the memory 1320 is a non-volatile memory unit.

The storage device 1330 is capable of providing mass storage for the system 1300. In some implementations, the storage device 1330 is a non-transitory computer-readable medium. In various different implementations, the storage device 1330 may include, for example, a hard disk device, an optical disk device, a solid-date drive, a flash drive, or some other large capacity storage device. For example, the storage device may store long-term data (e.g., database data, file system data, etc.). The input/output device 1340 provides input/output operations for the system 1300. In some implementations, the input/output device 1340 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1360. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1330 may be implemented in a distributed way over a network, for example as a server farm or a set of widely distributed servers, or may be implemented in a single computing device.

Although an example processing system has been described in FIG. 13, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 14:
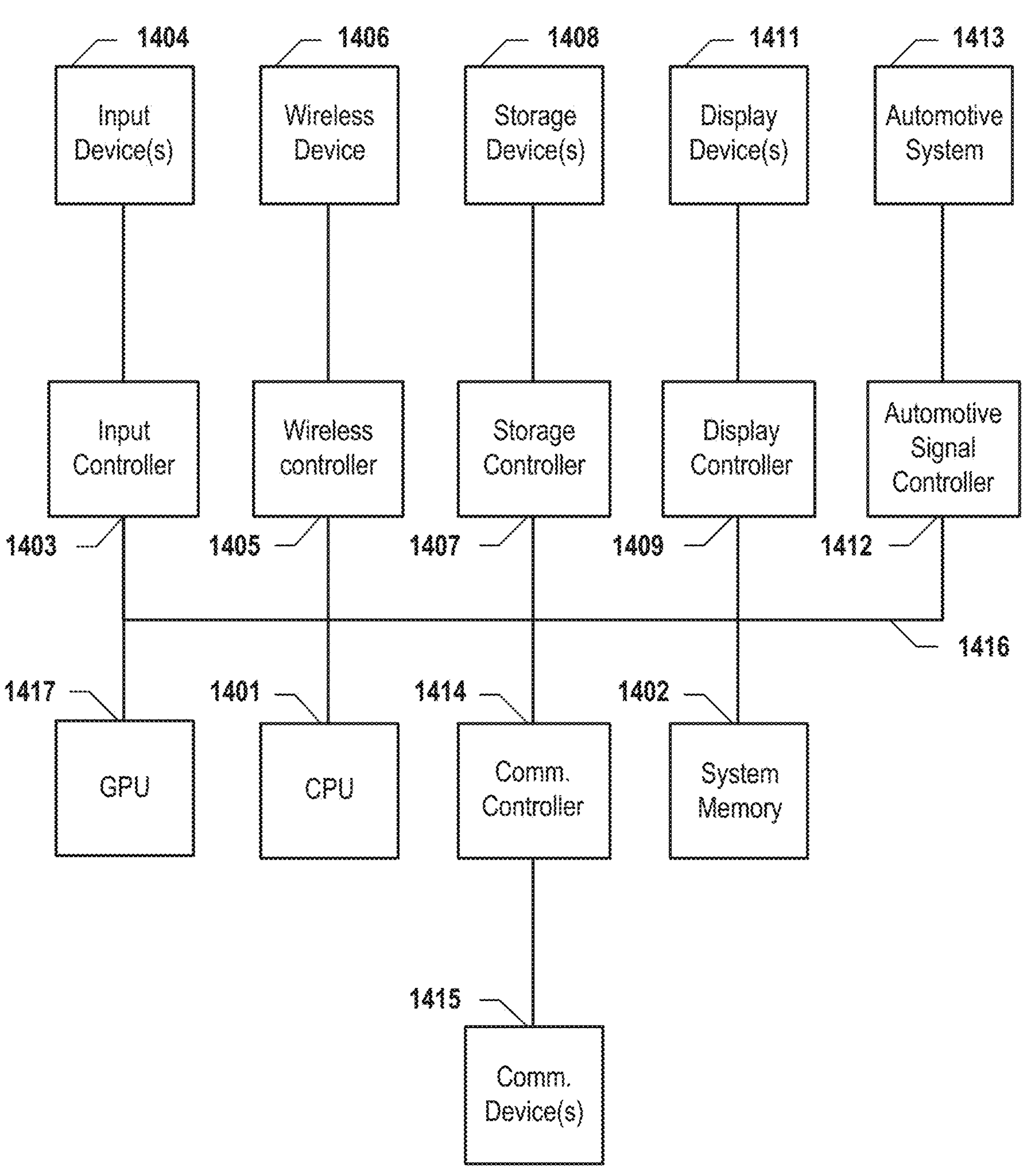
FIG. 14 is a block diagram of a computing device/information handling system, in accordance with some embodiments.

FIG. 14 depicts a simplified block diagram of a computing device/information handling system (or computing system) according to embodiments of the present disclosure. It will be understood that the functionalities shown for system 1400 may operate to support various embodiments of an information handling system—although it shall be understood that an information handling system may be differently configured and include different components.

As illustrated in FIG. 14, system 1400 includes one or more central processing units (CPU) 1101 that provide(s) computing resources and control(s) the computer. CPU 1401 may be implemented with a microprocessor or the like, and may also include one or more graphics processing units (GPU) 1417 and/or a floating point coprocessor for mathematical computations. System 1400 may also include a system memory 1402, which may be in the form of random-access memory (RAM), read-only memory (ROM), or both.

A number of controllers and peripheral devices may also be provided. For example, an input controller 1403 represents an interface to various input device(s) 1404, such as a keyboard, mouse, or stylus. There may also be a wireless controller 1405, which communicates with a wireless device 1406. System 1400 may also include a storage controller 1407 for interfacing with one or more storage devices 1408, each of which includes a storage medium such as a magnetic tape or disk, or an optical medium that might be used to record programs of instructions for operating systems, utilities, and applications, which may include embodiments of programs that implement various aspects of the techniques described herein. Storage device(s) 1408 may also be used to store processed data or data to be processed in accordance with some embodiments. System 1400 may also include a display controller 1409 for providing an interface to a display device 1411, which may be a cathode ray tube (CRT), a thin film transistor (TFT) display, or other type of display. The computing system 1400 may also include an automotive signal controller 1412 for communicating with an automotive system 1413. A communications controller 1414 may interface with one or more communication devices 1415, which enables system 1400 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into sub-modules or combined together.

In embodiments, aspects of the techniques described herein (e.g., timing the emission of optical signals, processing received return signals, generating point clouds, performing one or more (e.g., all) of the steps of the methods described herein, etc.) may be implemented using machine learning and/or artificial intelligence technologies.

"Machine learning" generally refers to the application of certain techniques (e.g., pattern recognition and/or statistical inference techniques) by computer systems to perform specific tasks. Machine learning techniques may be used to build models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. A value of a feature may be a measurement of the corresponding property of an entity or an instance of information regarding an entity. Features can also have data types. For instance, a feature can have an image data type, a numerical data type, a text data type (e.g., a structured text data type or an unstructured ("free") text data type), a categorical data type, or any other suitable data type. In general, a feature's data type is categorical if the set of values that can be assigned to the feature is finite.

As used herein, "model" may refer to any suitable model artifact generated by the process of using a machine learning algorithm to fit a model to a specific training data set. The terms "model," "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

"Artificial intelligence" (AI) generally encompasses any technology that demonstrates intelligence. Applications (e.g., machine-executed software) that demonstrate intelligence may be referred to herein as "artificial intelligence applications," "AI applications," or "intelligent agents." An intelligent agent may demonstrate intelligence, for example, by perceiving its environment, learning, and/or solving problems (e.g., taking actions or making decisions that increase the likelihood of achieving a defined goal). In many cases, intelligent agents are developed by organizations and deployed on network-connected computer systems so users within the organization can access them. Intelligent agents are used to guide decision-making and/or to control systems in a wide variety of fields and industries, e.g., security; transportation; risk assessment and management; supply chain logistics; and energy management. Intelligent agents may include or use models.

Some non-limiting examples of AI application types may include inference applications, comparison applications, and optimizer applications. Inference applications may include any intelligent agents that generate inferences (e.g., predictions, forecasts, etc.) about the values of one or more output variables based on the values of one or more input variables. In some examples, an inference application may provide a recommendation based on a generated inference. For example, an inference application for a lending organization may infer the likelihood that a loan applicant will default on repayment of a loan for a requested amount, and may recommend whether to approve a loan for the requested amount based on that inference. Comparison applications may include any intelligent agents that compare two or more possible scenarios. Each scenario may correspond to a set of potential values of one or more input variables over a period of time. For each scenario, an intelligent agent may generate one or more inferences (e.g., with respect to the values of one or more output variables) and/or recommendations. For example, a comparison application for a lending organization may display the organization's predicted revenue over a period of time if the organization approves loan applications if and only if the predicted risk of default is less than 20% (scenario #1), less than 10% (scenario #2), or less than 5% (scenario #3). Optimizer applications may include any intelligent agents that infer the optimum values of one or more variables of interest based on the values of one or more input variables. For example, an optimizer application for a lending organization may indicate the maximum loan amount that the organization would approve for a particular customer.

As used herein, "data analytics" may refer to the process of analyzing data (e.g., using machine learning models, artificial intelligence, models, or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

Data analytics tools are used to guide decision-making and/or to control systems in a wide variety of fields and industries, e.g., security; transportation; risk assessment and management; supply chain logistics; and energy management. The processes used to develop data analytics tools suitable for carrying out specific data analytics tasks generally include steps of data collection, data preparation, feature engineering, model generation, and/or model deployment.

As used herein, "spatial data" may refer to data relating to the location, shape, and/or geometry of one or more spatial objects. Data collected by lidar systems, devices, and chips described herein may be considered spatial data. A "spatial object" may be an entity or thing that occupies space and/or has a location in a physical or virtual environment. In some cases, a spatial object may be represented by an image (e.g., photograph, rendering, etc.) of the object. In some cases, a spatial object may be represented by one or more geometric elements (e.g., points, lines, curves, and/or polygons), which may have locations within an environment (e.g., coordinates within a coordinate space corresponding to the environment). In some cases, a spatial object may be represented as a cluster of points in a 3D point-cloud.

As used herein, "spatial attribute" may refer to an attribute of a spatial object that relates to the object's location, shape, or geometry. Spatial objects or observations may also have "non-spatial attributes." For example, a residential lot is a spatial object that that can have spatial attributes (e.g., location, dimensions, etc.) and non-spatial attributes (e.g., market value, owner of record, tax assessment, etc.). As used herein, "spatial feature" may refer to a feature that is based on (e.g., represents or depends on) a spatial attribute of a spatial object or a spatial relationship between or among spatial objects. As a special case, "location feature" may refer to a spatial feature that is based on a location of a spatial object. As used herein, "spatial observation" may refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

"Computer vision" generally refers to the use of computer systems to analyze and interpret image data. In some embodiments, computer vision may be used to analyze and interpret data collected by lidar systems (e.g., point-clouds). Computer vision tools generally use models that incorporate principles of geometry and/or physics. Such models may be trained to solve specific problems within the computer vision domain using machine learning techniques. For example, computer vision models may be trained to perform object recognition (recognizing instances of objects or object classes in images), identification (identifying an individual instance of an object in an image), detection (detecting specific types of objects or events in images), etc.

Computer vision tools (e.g., models, systems, etc.) may perform one or more of the following functions: image pre-processing, feature extraction, and detection/segmentation. Some examples of image pre-processing techniques include, without limitation, image re-sampling, noise reduction, contrast enhancement, and scaling (e.g., generating a scale space representation). Extracted features may be low-level (e.g., raw pixels, pixel intensities, pixel colors, gradients, patterns and textures (e.g., combinations of colors in close proximity), color histograms, motion vectors, edges, lines, corners, ridges, etc.), mid-level (e.g., shapes, surfaces, volumes, patterns, etc.), or high-level (e.g., objects, scenes, events, etc.). The detection/segmentation function may involve selection of a subset of the input image data (e.g., one or more images within a set of images, one or more regions within an image, etc.) for further processing.

SOME EMBODIMENTS

Some embodiments may include any of the following:

A1. A lidar device, comprising: a laser source configured to emit a transmit beam, an optical scanner, comprising at least one lens, configured to transmit a first portion of the transmit beam towards a target and receive a receive beam reflected by the target, a transmission medium configured to provide a propagation path for the transmit beam and the receive beam, and a target detection module configured to determine a range and/or a velocity of the target based on the receive beam and a second portion of the transmit beam reflected at a media-air interface defined at an end of the transmission medium where the first portion of the transmit beam is launched into air towards the at least one lens of the optical scanner.

A2. The lidar device of clause A1, wherein the second portion of the transmit beam is used as a local oscillator (LO) signal to determine the range and/or the velocity of the target.

A3. The lidar device of clause A1 or A2, wherein the lidar device includes a mixer configured to mix the receive beam and the second portion of the transmit beam to generate a mixed signal having a beat frequency.

A4. The lidar device of clause A3, wherein the range and/or the velocity of the target is determined from the beat frequency.

A5. The lidar device of any of clauses A1-A4, wherein the target detection module is configured to determine a reflectivity of the target based on the receive beam and the second portion of the transmit beam.

A6. The lidar device of any of clauses A1-A5, wherein a configuration of the media-air interface is adjustable to control at least one characteristic of the second portion of the transmit beam.

A7. The lidar device of clause A6, wherein the at least one characteristic of the second portion of the transmit beam comprises an intensity of the second portion of the transmit beam.

A8. The lidar device of clause of A6 or A7, wherein the configuration of the media-air interface corresponds to a configuration of the transmission medium.

A9. The lidar device of any of clauses A1-A8, wherein the media-air interface comprises an angled endface of the transmission medium.

A10. The lidar device of any of clauses A1-A9, wherein the media-air interface comprises an angled endface of a connector coupled to the transmission medium.

A11. The lidar device of any of clauses A1-A10, wherein the media-air interface comprises a coating applied to the transmission medium.

A12. The lidar device of any of clauses A1-A11, wherein the media-air interface comprises a grating integrated within the transmission medium.

A13. The lidar device of clause A12, wherein the grating is a fiber Bragg grating.

A14. A method of operating a lidar device, the method comprising: emitting, via a laser source, a transmit beam, transmitting, via an optical scanner comprising at least one lens, a first portion of the transmit beam towards a target, receiving, via the optical scanner, a receive beam reflected by the target, reflecting a second portion of the transmit beam at a media-air interface defined at an end of a transmission medium where the first portion of the transmit beam is launched into air towards the at least one lens of the optical scanner, the transmission medium being configured to provide a propagation path for the transmit beam and the receive beam, and determining, via a target detection module, a range and/or a velocity of the target based on the receive beam and the second portion of the transmit beam.

A15. The method of clause A14, wherein determining the range and/or the velocity of the target based on the receive beam and the second portion of the transmit beam comprises using the second portion of the transmit beam as a local oscillator (LO) signal.

A16. The method of clause A14 or A15, further comprising directing the receive beam and the second portion of the transmit beam to a mixer to generate a mixed signal having a beat frequency.

A17. The method of clause A16, wherein the range and/or the velocity of the target is determined from the beat frequency.

A18. The method of any of clauses A14-A17, further comprising determining, via the target detection module, a reflectivity of the target based on the receive beam and the second portion of the transmit beam.

A19. The method of any of clauses A14-A18, further comprising adjusting a configuration of the media-air interface to control at least one characteristic of the second portion of the transmit beam.

A20. The method of clause A19, wherein the at least one characteristic of the second portion of the transmit beam comprises an intensity of the second portion of the transmit beam.

A21. The method of clause A19 or A20, wherein the configuration of the media-air interface corresponds to a configuration of the transmission medium.

A22. The method of any of clauses A14-A21, wherein the media-air interface comprises an angled endface of the transmission medium.

A23. The method of any of clauses A14-A22, wherein the media-air interface comprises an angled endface of a connector coupled to the transmission medium.

A24. The method of any of clauses A14-A23, wherein the media-air interface comprises a coating applied to the transmission medium.

A25. The method of any of clauses A14-A24, wherein the media-air interface comprises a grating integrated within the transmission medium.

A26. The method of clause A25, wherein the grating is a fiber Bragg grating.

A27. A method of manufacturing a lidar device, the method comprising: optically coupling (i) a laser source configured to emit a transmit beam, (ii) an optical scanner, comprising at least one lens, configured to transmit a first portion of the transmit beam towards a target and receive a receive beam reflected by the target, and (iii) a transmission medium configured to provide a propagation path for the transmit beam and the receive beam, adjusting a configuration of a media-air interface defined at an end of the transmission medium where the first portion of the transmit beam is launched into air towards the at least one lens of the optical scanner to control at least one characteristic of a second portion of the transmit beam reflected at the media-air interface, and configuring a target detection module to determine a range and/or a velocity of the target based on the receive beam and the second portion of the transmit beam.

A28. The method of clause A27, further comprising optically coupling a mixer to the transmission medium, the mixer configured to mix the receive beam and the second portion of the transmit beam to generate a mixed signal having a beat frequency.

A29. The method of clause A28, wherein the range and/or the velocity of the target is determined from the beat frequency.

A30. The method of any of clauses A27-A29, further comprising configuring the target detection module to determine a reflectivity of the target based on the receive beam and the second portion of the transmit beam.

A31. The method of any of clauses A27-A30, wherein adjusting the configuration of the media-air interface comprises adjusting a configuration of the transmission medium.

A32. The method of any of clauses A27-A31, wherein the at least one characteristic of the second portion of the transmit beam comprises an intensity of the second portion of the transmit beam.

A33. The method of any of clauses A27-A32, wherein the media-air interface comprises an angled endface of the transmission medium.

A34. The method of any of clauses A27-A33, wherein the media-air interface comprises an angled endface of a connector coupled to the transmission medium.

A35. The method of any of clauses A27-A34, wherein the media-air interface comprises a coating applied to the transmission medium.

A36. The method of any of clauses A27-A35, wherein the media-air interface comprises a grating integrated within the transmission medium.

A37. The method of clause A36, wherein the grating is a fiber Bragg grating.

A38. A vehicle, comprising: at least one lidar device of any of clauses A1-A13, wherein each lidar device is configured to provide navigation and/or mapping for the vehicle and is disposed in an interior of the vehicle and/or on an exterior of the vehicle.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms “coupled,” “connected,” or “communicatively coupled” shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A lidar device, comprising:

a laser source configured to emit a transmit beam;

an optical scanner, comprising at least one lens, configured to transmit a first portion of the transmit beam towards a target and receive a receive beam reflected by the target;

a transmission medium configured to provide a propagation path for the transmit beam and the receive beam; and a target detection module configured to determine a range and/or a velocity of the target based on the receive beam and a second portion of the transmit beam reflected at a media-air interface defined at an end of the transmission medium where the first portion of the transmit beam is launched into air towards the at least one lens of the optical scanner, wherein the media-air interface comprises an angled endface of a connector coupled to the transmission medium.

2. The lidar device of claim 1, wherein the second portion of the transmit beam is used as a local oscillator (LO) signal to determine the range and/or the velocity of the target.

3. The lidar device of claim 1, further comprising a mixer configured to mix the receive beam and the second portion of the transmit beam to generate a mixed signal having a beat frequency.

4. The lidar device of claim 3, wherein the range and/or the velocity of the target is determined from the beat frequency.

5. The lidar device of claim 1, wherein the target detection module is configured to determine a reflectivity of the target based on the receive beam and the second portion of the transmit beam.

6. The lidar device of claim 1, wherein a configuration of the media-air interface is adjustable to control at least one characteristic of the second portion of the transmit beam.

7. The lidar device of claim 6, wherein the at least one characteristic of the second portion of the transmit beam comprises an intensity of the second portion of the transmit beam.

8. The lidar device of claim 6, wherein the configuration of the media-air interface corresponds to a configuration of the transmission medium.

9. A method of operating a lidar device, the method comprising:

emitting, via a laser source, a transmit beam;

transmitting, via an optical scanner comprising at least one lens, a first portion of the transmit beam towards a target;

receiving, via the optical scanner, a receive beam reflected by the target;

reflecting a second portion of the transmit beam at a media-air interface defined at an end of a transmission medium where the first portion of the transmit beam is launched into air towards the at least one lens of the optical scanner, the transmission medium being configured to provide a propagation path for the transmit beam and the receive beam; and determining, via a target detection module, a range and/or a velocity of the target based on the receive beam and the second portion of the transmit beam, wherein the media-air interface comprises a grating integrated within the transmission medium.

10. A method of manufacturing a lidar device, the method comprising:

optically coupling (i) a laser source configured to emit a transmit beam, (ii) an optical scanner, comprising at least one lens, configured to transmit a first portion of the transmit beam towards a target and receive a receive beam reflected by the target, and (iii) a transmission medium configured to provide a propagation path for the transmit beam and the receive beam;

adjusting a configuration of a media-air interface defined at an end of the transmission medium where the first portion of the transmit beam is launched into air towards the at least one lens of the optical scanner to control at least one characteristic of a second portion of the transmit beam reflected at the media-air interface, wherein the media-air interface comprises a grating integrated within the transmission medium; and configuring a target detection module to determine a range and/or a velocity of the target based on the receive beam and the second portion of the transmit beam.

11. The method of claim 10, further comprising:

optically coupling a mixer to the transmission medium, the mixer configured to mix the receive beam and the second portion of the transmit beam to generate a mixed signal having a beat frequency.

12. The method of claim 11, wherein the range and/or the velocity of the target is determined from the beat frequency.

13. The method of claim 10, wherein adjusting the configuration of the media-air interface comprises adjusting a configuration of the transmission medium.

14. The method of claim 10, wherein the at least one characteristic of the second portion of the transmit beam comprises an intensity of the second portion of the transmit beam.

15. A vehicle, comprising:

at least one lidar device of claim 1, wherein each lidar device is configured to provide navigation and/or mapping for the vehicle and is disposed in an interior of the vehicle and/or on an exterior of the vehicle.

16. The method of claim 9 wherein the grating integrated within the transmission medium is a fiber Bragg grating.

17. The method of claim 10 wherein the grating integrated within the transmission medium is a fiber Bragg grating.

* * * * *